US012706028B2

(12) United States Patent
Jeong et al.

(10) Patent No.: US 12,706,028 B2
(45) Date of Patent: Aug. 11, 2026

(54) DISPLAY DEVICE

(71) Applicant: LG Display Co., Ltd., Seoul (KR)

(72) Inventors: Yongmin Jeong, Seoul (KR); DongHo Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/061,466

(22) Filed: Feb. 24, 2025

(65) Prior Publication Data

US 2025/0279043 A1 Sep. 4, 2025

(30) Foreign Application Priority Data

Feb. 29, 2024 (KR) ........................ 10-2024-0030256

(51) Int. Cl.

*G09G 3/32* (2016.01)
*G09G 3/3208* (2016.01)
*G09G 3/3233* (2016.01)
*G09G 3/3266* (2016.01)

(52) U.S. Cl.

CPC ............ *G09G 3/32* (2013.01); *G09G 3/3208* (2013.01); *G09G 3/3233* (2013.01); *G09G 3/3266* (2013.01); *G09G 2310/0243* (2013.01); *G09G 2310/0264* (2013.01); *G09G 2310/0267* (2013.01); *G09G 2310/0286* (2013.01); *G09G 2310/067* (2013.01); *G09G 2310/08* (2013.01); *G09G 2330/021* (2013.01)

(58) Field of Classification Search

CPC ...... G09G 3/32; G09G 3/3208; G09G 3/3233; G09G 3/3266; G09G 2310/0243; G09G 2310/0264; G09G 2310/0267; G09G 2310/0286; G09G 2310/067; G09G 2310/08; G09G 2330/021

See application file for complete search history.

(56) References Cited

U.S. PATENT DOCUMENTS

2016/0182042 A1* 6/2016 Kim .......................... G06F 1/04 327/109

FOREIGN PATENT DOCUMENTS

KR 10-2019-0030962 A 3/2019
KR 10-2022-0093764 A 7/2022
KR 20220093764 A * 7/2022 ........... G09G 3/3275

* cited by examiner

*Primary Examiner* — Cory A Almeida
(74) *Attorney, Agent, or Firm* — Fenwick & West LLP

(57) ABSTRACT

A display device includes a gate driver which supplies a gate signal to pixels and includes a plurality of stages, wherein each of the stages includes a pull-down unit which outputs a first voltage applied to a first voltage line responsive to a voltage of a Q node as the gate signal, a pull-up unit which outputs a second voltage applied to a second voltage line responsive to a voltage of a QB node as the gate signal, a Q node controller which controls the voltage of the Q node responsive to a start signal and a clock signal and a QB node controller which includes a first transistor including a gate electrode connected to a clock signal line to which the clock signal is supplied and controls the voltage of the QB node responsive to the clock signal, the start signal, and the voltage of the Q node.

15 Claims, 25 Drawing Sheets

DISPLAY DEVICE

CROSS-REFERENCE TO RELATED APPLICATION

This application claims the priority of Republic of Korea Patent Application No. 10-2024-0030256 filed on Feb. 29, 2024, which is hereby incorporated by reference in its entirety.

BACKGROUND

Field

The present disclosure relates to a display device, and more particularly, to a display device which is driven at a low power.

Description of the Related Art

As technology in modern society develops, display devices are used in various ways to provide information to users. The display devices include not only electronic signs which simply transmit visual information in one direction, but also various electronic devices which require a higher level of technology to check user's input and provide information in response to the checked input.

A representative display device may include a liquid crystal display (LCD) device, a field emission display (FED) device, an electro-wetting display (EWD) device, an organic light emitting display (OLED) device, and the like.

Among them, the organic light emitting display device is a self-emitting display device so that a separate light source is not necessary, which is different from the liquid crystal display device. Therefore, the organic light emitting display device may be manufactured to have a light weight and a small thickness. Further, since the organic light emitting display device is advantageous not only in terms of power consumption due to the low voltage driving, but also in terms of color implementation, a response speed, a viewing angle, and a contrast ratio (CR), it is expected to be utilized in various fields.

SUMMARY

An object to be achieved by the present disclosure is to provide a display device which minimizes a bezel.

Another object to be achieved by the present disclosure is to provide a display device which reduces power consumption to be driven at a low power.

Objects of the present disclosure are not limited to the above-mentioned objects, and other objects, which are not mentioned above, can be clearly understood by those skilled in the art from the following descriptions.

In one embodiment, a display device comprises: a display panel including a plurality of pixels; and a gate driver configured to supply a gate signal to the plurality of pixels, the gate driver including a plurality of stages that each comprise: a pull-down circuit configured to output as the gate signal a first voltage that is applied to a first voltage line responsive to a voltage of a Q node; a pull-up circuit configured to output as the gate signal a second voltage that is applied to a second voltage line responsive to a voltage of a QB node; a Q node controller connected to the Q node, the Q node controller configured to control the voltage of the Q node responsive to a start signal and a clock signal received by the Q node controller; and a QB node controller connected to the QB node, the QB node controller including a first transistor having a gate electrode that is connected to a clock signal line that supplies the clock signal and controls the voltage of the QB node responsive to the clock signal, the start signal, and the voltage of the Q node.

In one embodiment, a display device comprises: a display panel including a display area having a plurality of pixels and a non-display area surrounding the display area; a gate link line supplying one or more of a start signal, a clock signal, a first voltage, and a second voltage, at least a portion of the gate link line in the display area of the display panel; and a gate driver in the display area, the gate driver configured to supply a gate signal to the plurality of pixels, the gate driver including a plurality of stages that each comprise: a pull-down circuit configured to output as the gate signal the first voltage that is applied to a first voltage line responsive to a voltage of a Q node; a pull-up circuit configured to output as the gate signal the second voltage that is applied to a second voltage line responsive to a voltage of a QB node; a Q node controller connected to the Q node, the Q node controller configured to control the voltage of the Q node responsive to the start signal and the clock signal; and a QB node controller connected to the QB node, the QB node controller including a first transistor having a gate electrode that receives the clock signal and controls the voltage of the QB node responsive to the clock signal, the start signal, and the voltage of the Q node.

Other detailed matters of the exemplary embodiments are included in the detailed description and the drawings.

According to the present disclosure, the gate driver is disposed in the active area to minimize the non-active area, thereby minimizing the bezel.

According to the present disclosure, a capacitor which causes a lot of power consumption is omitted to reduce the power consumption, thereby allowing the display device to be driven at a low power.

According to the present disclosure, a QB node of a previous stage is connected to a gate electrode of a transistor which is disposed in a next stage to ensure the reliability of the QB node of the previous stage.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
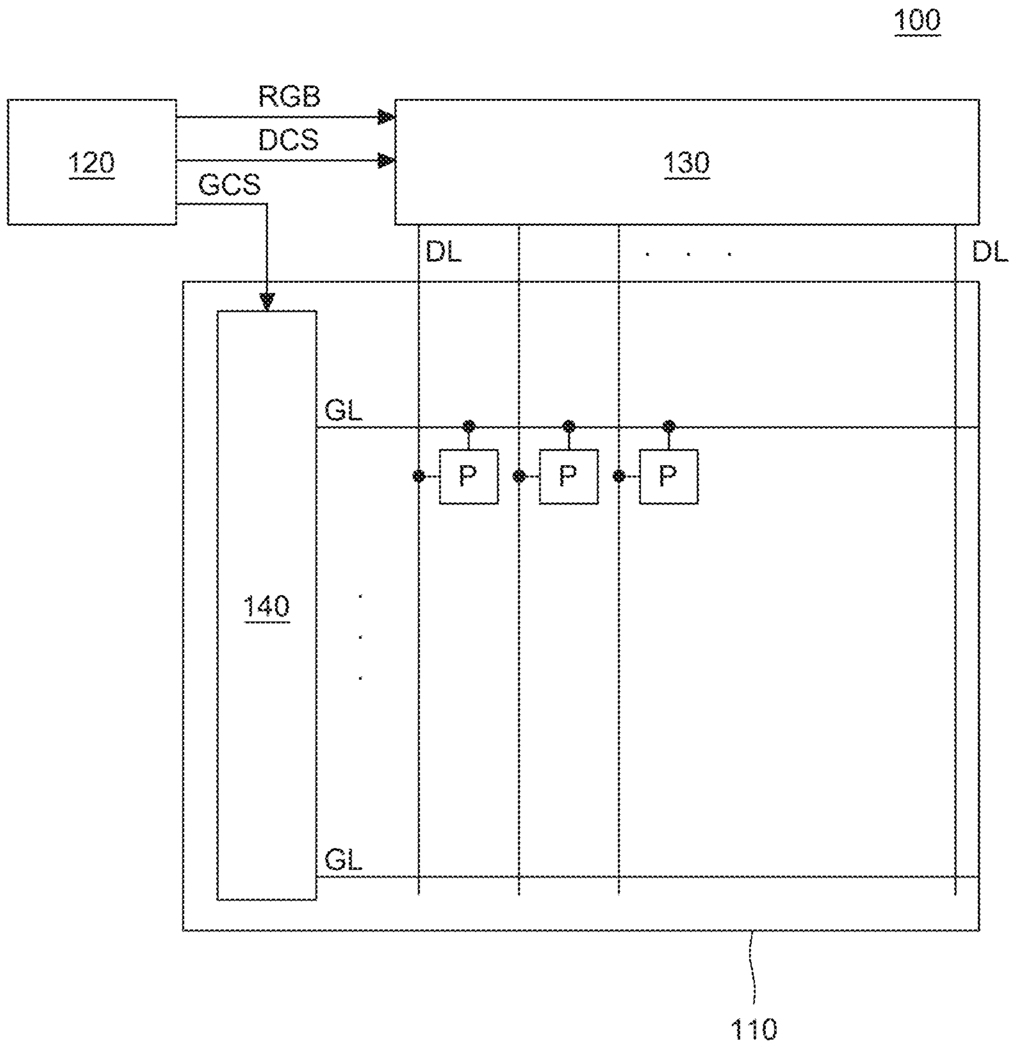
FIG. 1 is a functional block diagram of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise. Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a functional block diagram of a display device according to an exemplary embodiment of the present disclosure.

Referring to FIG. 1, a display device 100 according to the exemplary embodiment of the present disclosure includes a display panel 110, a timing controller 120, a data driver 130, and a gate driver 140.

In the display panel 110, a plurality of pixels P for displaying images may be disposed.

In the display panel 110, a plurality of gate lines GL disposed in a first direction and a plurality of data lines DL disposed in a second direction which is different from the first direction may be disposed. The plurality of gate lines GL and the plurality of data lines DL may intersect and the plurality of pixels P may be disposed in a matrix.

The plurality of pixels P may be electrically connected to the plurality of gate lines GL and the plurality of data lines DL. Therefore, a gate signal and a data voltage may be applied to each pixel P through the gate lines GL and the data lines DL. Each pixel P implements a gray scale by the gate signal and the data voltage to display the image on the display panel 110.

Each of the plurality of pixels P may be any one of a red pixel, a green pixel, a blue pixel, and a white pixel. The red pixel, the green pixel, the blue pixel, and the white pixel may configure one unit pixel to implement colors. Colors implemented in the unit pixel may be determined according to an emission ratio of the red pixel, the green pixel, the blue pixel, and the white pixel. In the meantime, the white pixel may be omitted in the unit pixel. One data line DL and one gate line GL may be connected to each of the plurality of pixels P.

The timing controller 120 may transmit an input image signal RGB received from a host system to the data driver 130.

The timing controller 120 may generate control signals GCS and DCS to control operation timings of the data driver 130 and the gate driver 140 using a timing signal which is received together with the image data RGB.

In other words, the timing controller 120 is applied with the timing signal to output a gate control signal GCS to the gate driver 140 and output a data control signal DCS to the data driver 130.

The data driver 130 is applied with the data control signal DCS to output a data voltage to the data line DL.

Specifically, the data driver 130 generates a sampling signal in accordance with the data control signal DCS and latches the image data RGB in accordance with the sampling signal to be converted into a data voltage and then may supply the data voltage to the data line DL in response to a source output enable (SOE) signal.

The data driver 130 is connected to the bonding pad of the display panel 110 in a chip on glass (COG) manner or may be directly disposed on the display panel 110. In some cases, the data driver 130 may be disposed to be integrated with the display panel 110. Further, the data driver 130 may be disposed in a chip on film (COF) manner.

The gate driver 140 may generate a scan signal and an emission signal (or an emission control signal) based on the gate control signal GCS. The gate driver 140 may include a scan driver and an emission signal driver. The scan driver generates a scan signal in a row sequential manner to drive at least one scan line connected to each pixel row to supply the scan signal to the scan lines. The emission signal driver generates an emission signal in a row sequential manner to drive at least one emission signal line connected to each pixel row to supply the emission signal to the emission signal lines.

Figure 2:
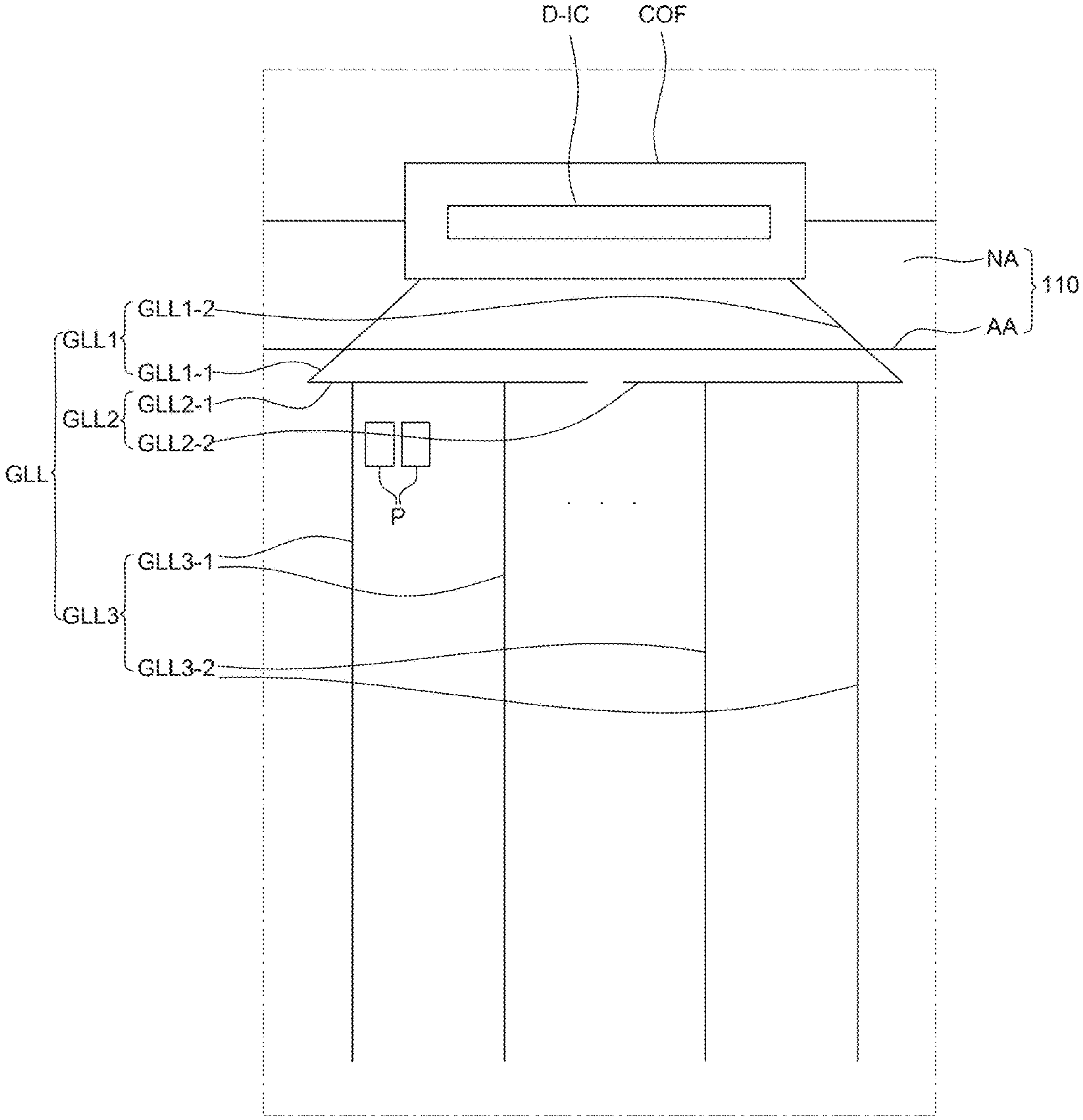
FIG. 2 is a schematic view for explaining a part of an active area of a display device according to an exemplary embodiment of the present disclosure.

FIG. 2 is a schematic view for explaining a part of an active area of a display device according to an exemplary embodiment of the present disclosure. In FIG. 2, for the convenience of description, a flexible film COF and a gate link line GLL which are disposed in a part of the display panel 110 are illustrated.

Referring to FIG. 2, the display panel 110 includes an active area AA (e.g., a display area) in which images are displayed and a non-active area NA (e.g., a non-display area) which is located at the outside of the active area AA and includes a pad which is in contact with the flexible film COF and various signal lines. The non-active area NA surrounds or encloses the active area AA in a plan view of the display panel 110.

The non-active area NA is an area where no image is displayed and various lines for driving the plurality of pixels P disposed in the active area AA are disposed. The non-active area NA may be referred to as a bezel area. A plurality of pads may be disposed in a non-active area NA located at an upper edge of the display panel 110 among the non-active areas NA. The flexible film COF may be connected to the pad.

The flexible film COF may be a film in which various components such as a driving IC D-IC are disposed on a base film having ductility to supply signals to the plurality of pixels P and the gate driver 140. For example, the flexible film COF may supply a power voltage, a gate control signal, and a data voltage to the plurality of pixels P and the gate driver 140.

The plurality of gate link lines GLL may be disposed in the display panel 110. At least a part of the gate link lines are in the active area AA.

The plurality of gate link lines GLL may supply a gate control signal GCS, such as a clock signal, a gate high signal, a gate low signal, and a start signal, to control the gate driver 140.

The plurality of gate link lines GLL includes a first gate link line GLL1, a second gate link line GLL2, and a third gate link line GLL3.

One end of the first gate link line GLL1 is connected to the flexible film COF so that the first gate link line extends toward the active area AA. For example, the first gate link line GLL1 may include a 1-1-th gate link line GLL1-1 which is connected to one side (e.g., a first side) of the flexible film COF to extend toward the active area AA and a 1-2-th gate link line GLL1-2 which is connected to the other side (e.g., a second side) of the flexible film COF to extend toward the active area AA. As shown in FIG. 2, the 1-1-th gate link line GLL1-1 extends from the non-active area NA to the active area AA at a first side (e.g., left side) of the active area AA and the 1-2-th gate link line GLL1-2 extends from the non-active area NA to the active area AA at a second side (e.g., a right side) of the active area AA that is spaced apart from the first side in a row direction.

The second gate link line GLL2 is connected to the first gate link line GLL1 to extend in the first direction. For example, the second gate link line GLL2 may include a 2-1-th gate link line GLL2-1 and a 2-2-th gate link line GLL2-2. The 2-1-th gate link line GLL2-1 is connected to the 1-1-th gate link line GLL1-1 to extend to a row direction in the upper edge of the active area AA towards the second side of the active area AA. The 2-2-th gate link line GLL2-2 is connected to the 1-2-th gate link line GLL1-2 to extend to the row direction in the upper edge of the active area AA toward the first side of the active area AA. However, in the exemplary embodiment of the present disclosure, even though it is illustrated that the second gate link line GLL2 is disposed in the active area AA, it is not limited thereto and the second gate link line may be disposed in the non-active area NA.

The third gate link line GLL3 is connected to the second gate link line GLL2 to extend in the second direction. For example, the third gate link line GLL3 may include a plurality of 3-1-th gate link lines GLL3-1 which is connected to the 2-1-th gate link line GLL2-1 to extend to a column direction of the active area AA. Further, the third gate link line GLL3 may include a plurality of 3-2-th gate link lines GLL3-2 which is connected to the 2-2-th gate link line GLL2-2 to extend to the column direction of the active area AA.

In the meantime, the first gate link line GLL1, the second gate link line GLL2, and the third gate link line GLL3 are divided into two gate link lines to be disposed on both sides of the flexible film COF. Therefore, as compared with a structure in which the first gate link line GLL1, the second gate link line GLL2, and the third gate link line GLL3 are configured as one to be connected to the flexible film COF, the number of lines and a distance are small so that a load and a signal delay according to the load may be reduced.

Figure 3:
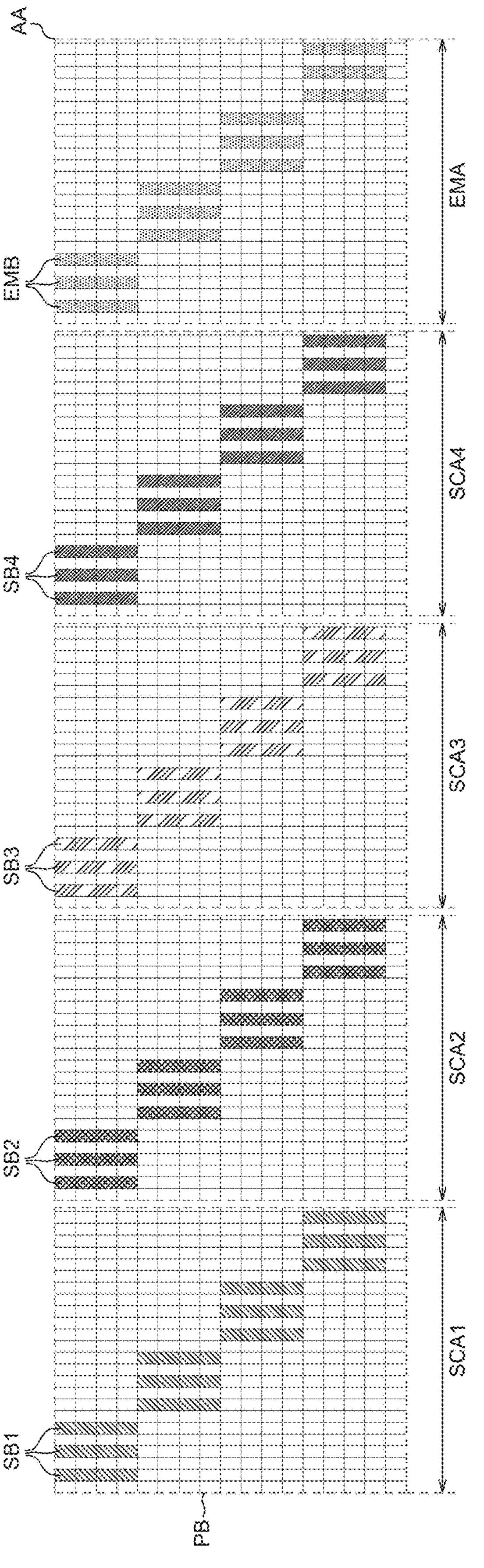
FIG. 3 is a schematic view for explaining a placement of a gate driver in an active area of a display device according to an exemplary embodiment of the present disclosure.

FIG. 3 is a schematic view for explaining a placement of a gate driver in an active area of a display device according to an exemplary embodiment of the present disclosure. In FIG. 3, a part of the active area AA is illustrated for the convenience of description. In FIG. 3, for the convenience of description, a pixel block PB, a first scan block SB1, a second scan block SB2, a third scan block SB3, a fourth scan block SB4, and an emission block EMB are illustrated.

The gate driver is disposed in the active area AA. For example, the gate driver may include a first scan driver, a second scan driver, a third scan driver, a fourth scan driver, and an emission driver. However, it is not limited thereto and it may be changed depending on the design of the pixel.

Referring to FIG. 3, in the active area AA, a first scan driver area SCA1, a second scan driver area SCA2, a third scan driver area SCA3, a fourth scan driver area SCA4, and an emission driver area EMA may be disposed. For example, in the first scan driver area SCA1, the first scan driver is disposed, in the second scan driver area SCA2, the second scan driver is disposed. Further, in the third scan driver area SCA3, the third scan driver is disposed, and in the fourth scan driver area SCA4, the fourth scan driver is disposed. In the emission driver area EMA, the emission driver may be disposed.

In each of the first scan driver area SCA1, the second scan driver area SCA2, the third scan driver area SCA3, the fourth scan driver area SCA4, and the emission driver area EMA, a pixel block PB, a plurality of scan block SB1, SB2, SB3, and SB4 in which gate drivers are disposed to be distributed, and a plurality of emission blocks EMB may be disposed.

In each of the pixel blocks PB, a pixel P may be disposed.

A plurality of first scan blocks SB1 may be disposed in the first scan driver area SCA1. In the plurality of first scan blocks SB1, first scan drivers may be distributed. A plurality of first scan blocks SB1 may be disposed in the active area AA in the column direction. The plurality of first scan blocks SB1 may be disposed between the pixel blocks PB. For example, the plurality of first scan blocks SB1 are configured by three first scan blocks and may be disposed alternately with the pixel blocks PB in the row direction. However, it is not limited thereto and the number of first scan blocks SB1 and a placement position may be changed depending on the design.

A plurality of second scan blocks SB2 may be disposed in the second scan driver area SCA2. In the plurality of second scan blocks SB2, second scan drivers may be distributed. A plurality of second scan blocks SB2 may be disposed in the active area AA in the column direction. The plurality of second scan blocks SB2 may be disposed between the pixel blocks PB. For example, the plurality of second scan blocks SB2 is configured by three second scan blocks and may be disposed alternately with the pixel blocks PB in the row direction. However, it is not limited thereto and the number of second scan blocks SB2 and a placement position may be changed depending on the design.

A plurality of third scan blocks SB3 may be disposed in the third scan driver area SCA3. In the plurality of third scan blocks SB3, third scan drivers may be distributed. A plurality of third scan blocks SB3 may be disposed in the active area AA in the column direction. The plurality of third scan blocks SB3 may be disposed between the pixel blocks PB. For example, the plurality of third scan blocks SB3 is configured by three third scan blocks and may be disposed alternately with the pixel blocks PB in the row direction. However, it is not limited thereto and the number of third scan blocks SB3 and a placement position may be changed depending on the design.

A plurality of fourth scan blocks SB4 may be disposed in the fourth scan driver area SCA4. In the plurality of fourth scan blocks SB4, fourth scan drivers may be distributed. A plurality of fourth scan blocks SB4 may be disposed in the active area AA in the column direction. The plurality of fourth scan blocks SB4 may be disposed between the pixel blocks PB. For example, the plurality of fourth scan blocks SB4 is configured by three fourth scan blocks and may be disposed alternately with the pixel blocks PB in the row direction. However, it is not limited thereto and the number of fourth scan blocks SB4 and a placement position may be changed depending on the design.

A plurality of emission blocks EMB may be disposed in the emission driver area EMA. In the plurality of emission blocks EMB, the emission drivers may be distributed. A plurality of emission blocks EMB may be disposed in the active area AA in the column direction. The plurality of emission blocks EMB may be disposed between the pixel blocks. For example, the plurality of emission blocks EMB is configured by three emission blocks and may be disposed alternately with the pixel blocks PB in the row direction. However, it is not limited thereto and the number of emission blocks EMB and a placement position may be changed depending on the design.

The first scan driver outputs a first scan signal in response to a gate control signal from the timing controller 120 and the second scan driver outputs a second scan signal in response to a gate control signal from the timing controller 120. The third scan driver outputs a third scan signal in response to a gate control signal from the timing controller 120 and a fourth scan driver outputs a fourth scan signal in response to a gate control signal from the timing controller 120. An emission driver may output an emission signal in response to a gate control signal from the timing controller 120. One scan driver of the first scan driver, the second scan driver, the third scan driver, the fourth scan driver, and the emission driver may be configured by a shift register circuit. Further, the remaining scan drivers and the emission driver may be configured by edge trigger circuits. For example, the second scan driver is configured by a shift register circuit and the first scan driver, the third scan driver, the fourth scan driver, and the emission driver may be configured by edge trigger circuits, but it is not limited thereto.

Each of the first scan driver, the second scan driver, the third scan driver, the fourth scan driver, and the emission driver may include a plurality of stages which are independently connected.

Each of the plurality of stages may supply a scan signal and an emission signal to the plurality of pixels P disposed in a corresponding pixel line. Here, the pixel line may refer to a set of pixels corresponding to one line that is connected to one gate line disposed in the row direction. For example, a first stage may supply a scan signal and an emission signal to the plurality of pixels P disposed in a first pixel line. Further, an n-th stage may supply a scan signal and an emission signal to the plurality of pixels P disposed in an n-th pixel line.

The first stage operates by receiving a start signal VST and the n-th stage may operate by receiving an output signal of a previous stage, that is, a scan signal and an emission signal, as a carry signal.

Hereinafter, a configuration of the plurality of pixels P will be described in detail.

Figure 4:
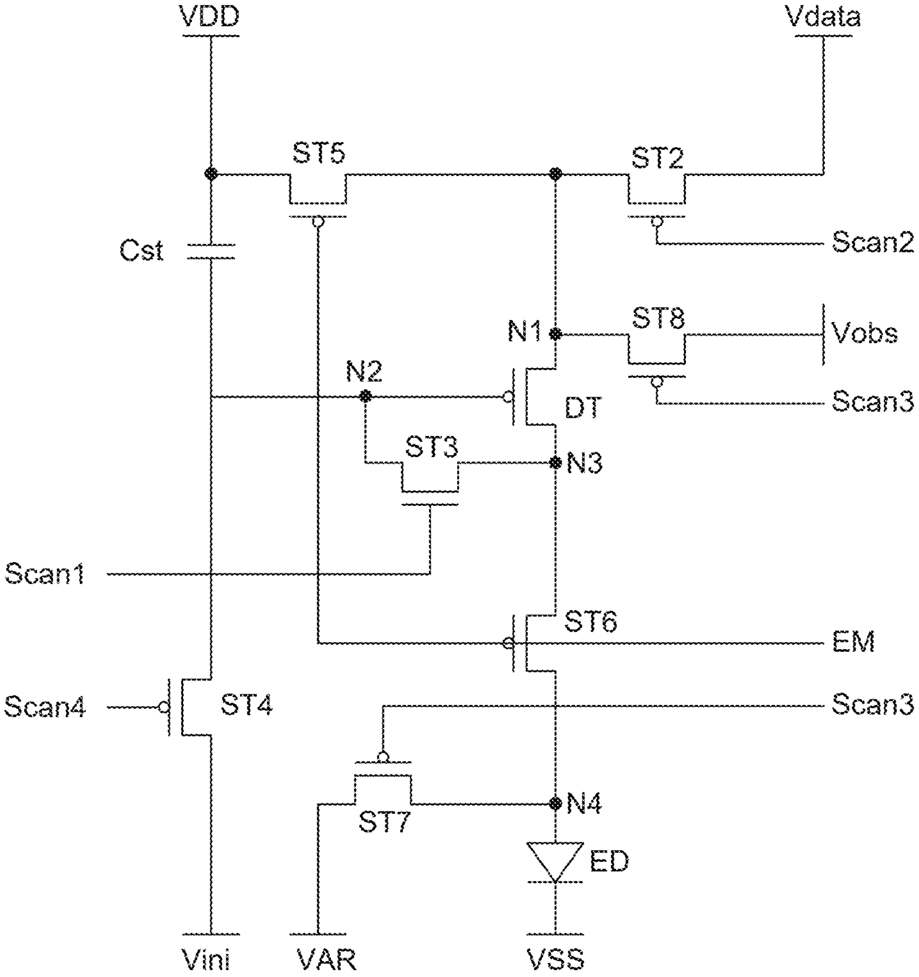
FIG. 4 is an exemplary circuit diagram of a pixel of a display device according to an exemplary embodiment of the present disclosure.

FIG. 4 is an exemplary circuit diagram of a pixel of a display device according to an exemplary embodiment of the present disclosure.

Referring to FIG. 4, a circuit of the pixel P may include a light emitting diode ED, a driving transistor DT, a second switching transistor ST2, a third switching transistor ST3, a fourth switching transistor ST4, a fifth switching transistor ST5, a sixth switching transistor ST6, a seventh switching transistor ST7, an eighth switching transistor ST8, and a storage capacitor Cst.

The light emitting diode ED may emit light by a driving current supplied from the driving transistor DT. An anode electrode of the light emitting diode ED is connected to a fourth node N4 and a cathode electrode of the light emitting diode ED may be connected to a low potential power line to which a low potential power voltage VSS is supplied.

The driving transistor DT controls a driving current applied to the light emitting diode ED in accordance with a source-gate voltage Vsg. The driving transistor DT may be a p-type MOSFET (PMOS) or may be implemented by a low temperature polycrystalline silicon (LTPS) thin film transistor. Further, a source electrode of the driving transistor DT is connected to a first node N1, a gate electrode is connected to a second node N2, and a drain electrode may be connected to a third node N3. The driving transistor DT may be referred to as a first switching transistor.

The second switching transistor ST2 applies a data voltage Vdata supplied from a data line to the first node N1 which is the source electrode of the driving transistor DT. The second switching transistor ST2 may be a p-type MOSFET (PMOS) or may be implemented by a low temperature polycrystalline silicon (LTPS) thin film transistor. The second switching transistor ST2 includes a source electrode connected to the data line, a drain electrode connected to the first node N1, and a gate electrode connected to a second scan signal line which transmits a second scan signal Scan2. Accordingly, the second switching transistor ST2 applies a data voltage Vdata supplied from the data line to the first node N1 which is the source electrode of the driving transistor DT, in response to a low level of second scan signal Scan2 which is a turn-on voltage.

The third switching transistor ST3 diode-connects the gate electrode and the drain electrode of the driving transistor DT. The third switching transistor ST3 may be an n-type MOSFET (NMOS) and may be implemented by an oxide thin film transistor to minimize or at least reduce a leakage current during a turn-off period. The third switching transistor ST3 includes a drain electrode or a source electrode connected to the third node N3, a source electrode or a drain electrode connected to the second node N2, and a gate electrode connected to a first scan signal line which transmits a first scan signal Scan1. Therefore, the third switching transistor ST3 diode-connects the gate electrode and the drain electrode of the driving transistor DT in response to a high level of first scan signal Scan1 which is a turn-on voltage.

The fourth switching transistor ST4 applies an initialization signal Vini to the second node N2 which is the gate electrode of the driving transistor DT. The fourth switching transistor ST4 may be a p-type MOSFET (PMOS) or may be implemented by a low temperature polycrystalline silicon (LTPS) thin film transistor. The fourth switching transistor ST4 includes a source electrode connected to an initialization signal line which transmits an initialization signal Vini, a drain electrode connected to the second node N2, and a gate electrode connected to a fourth scan signal line which transmits a fourth scan signal Scan4. Accordingly, the fourth switching transistor ST4 applies the initialization signal Vini to the second node N2 which is the gate electrode of the driving transistor DT, in response to a low level of fourth scan signal Scan4 which is a turn-on voltage.

The fifth switching transistor ST5 applies a high potential power voltage VDD to the first node N1 which is the source electrode of the driving transistor DT. The fifth switching transistor ST5 may be a p-type MOSFET (PMOS) or may be implemented by a low temperature polycrystalline silicon (LTPS) thin film transistor. The fifth switching transistor ST5 includes a source electrode connected to a high potential driving voltage line which transmits a high potential power voltage VDD, a drain electrode connected to the first node N1, and a gate electrode connected to an emission signal line which transmits an emission signal EM. Accordingly, the fifth switching transistor ST5 applies the high potential power voltage VDD to the first node N1 which is the source electrode of the driving transistor DT, in response to a low level of emission signal EM which is a turn-on voltage.

The sixth switching transistor ST6 forms a current path between the driving transistor DT and the light emitting diode ED. The sixth switching transistor ST6 may be a p-type MOSFET (PMOS) or may be implemented by a low temperature polycrystalline silicon (LTPS) thin film transistor. The sixth switching transistor ST6 includes a source electrode connected to the third node N3, a drain electrode connected to the fourth node N4, and a gate electrode connected to the emission signal line which transmits an emission signal EM. The sixth switching transistor ST6 forms a current path between the third node N3 which is the source electrode of the sixth switching transistor ST6 and the fourth node N4 which is the drain electrode of the sixth switching transistor ST6, in response to the emission signal EM. Accordingly, the sixth switching transistor ST6 forms a current path between the driving transistor DT and the light emitting diode ED in response to a low level of emission signal EM which is a turn-on voltage.

The seventh switching transistor ST7 applies a reset voltage VAR to the fourth node N4 which is an anode of the light emitting diode ED. The seventh switching transistor ST7 may be a p-type MOSFET (PMOS) or may be implemented by a low temperature polycrystalline silicon (LTPS) thin film transistor. The seventh switching transistor ST7 includes a source electrode connected to a reset voltage line which transmits a reset voltage VAR, a drain electrode connected to the fourth node N4, and a gate electrode connected to a third scan signal line which transmits a third scan signal Scan3. Accordingly, the seventh switching transistor ST7 applies the reset voltage VAR to the fourth node N4 which is the anode of the light emitting diode ED, in response to a low level of third scan signal Scan3 which is a turn-on level.

The eighth switching transistor ST8 applies an on-bias stress voltage Vobs to the first node N1 which is the source electrode of the driving transistor DT. The eighth switching transistor ST8 may be a p-type MOSFET (PMOS) or may be implemented by a low temperature polycrystalline silicon (LTPS) thin film transistor. The eighth switching transistor ST8 includes a source electrode connected to an on-bias stress voltage line which transmits an on-bias stress voltage Vobs, a drain electrode connected to the first node N1, and a gate electrode connected to a third scan signal line which transmits a third scan signal Scan3. Accordingly, the eighth switching transistor ST8 applies the on-bias stress voltage Vobs to the first node N1 which is the source electrode of the driving transistor DT, in response to a low level of third scan signal Scan3 which is a turn-on level.

The storage capacitor Cst may store a voltage applied to the second node N2. The storage capacitor Cst includes a first electrode connected to the second node N2 and a second electrode connected to the high potential power voltage line which transmits a high potential power voltage VDD. That is, one electrode of the storage capacitor Cst is connected to the gate electrode of the driving transistor DT and the other electrode of the storage capacitor Cst is connected to the high potential power line which transmits the high potential power voltage VDD.

Hereinafter, the gate driver 140 will be described in more detail.

Figure 5:
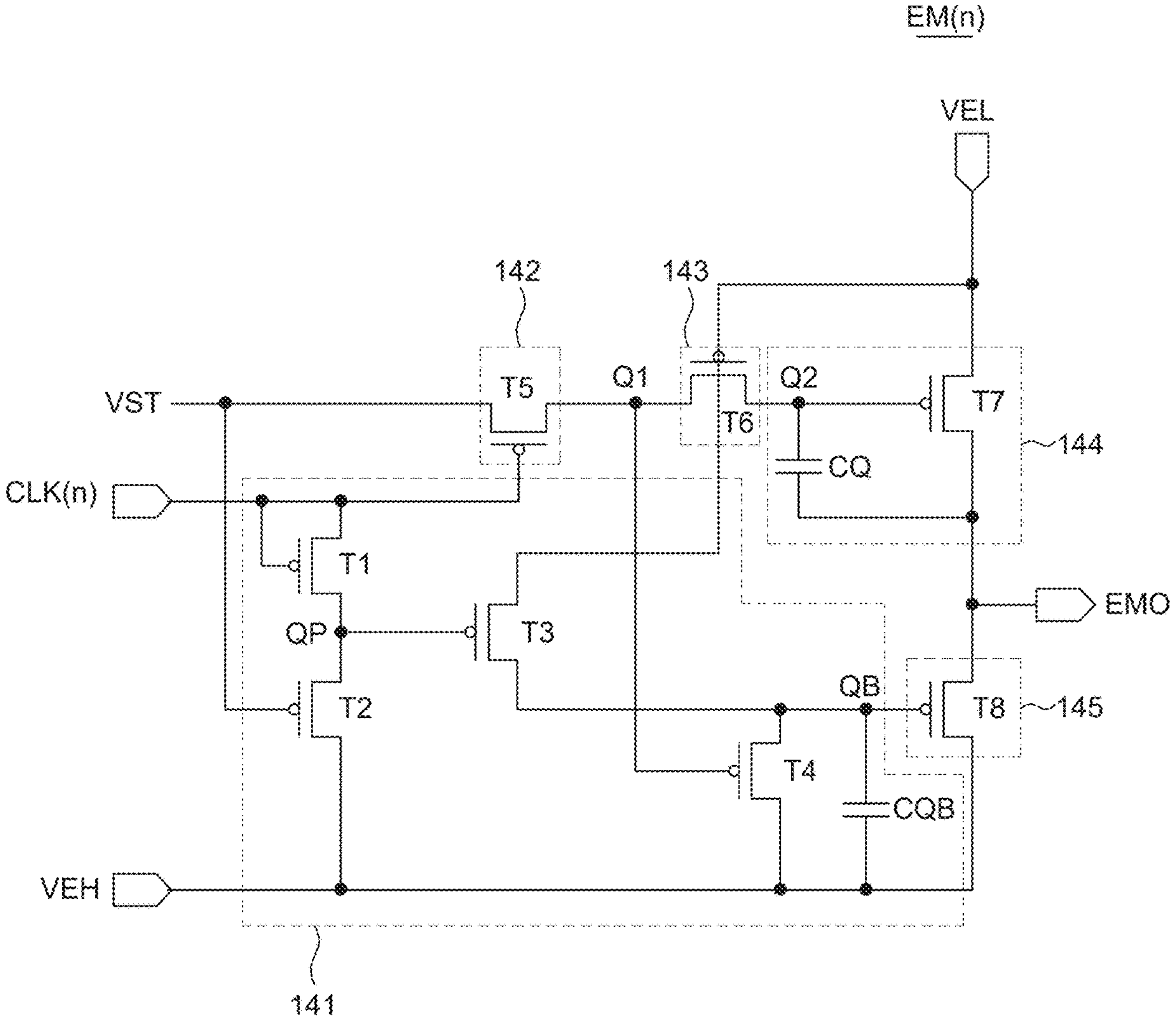
FIG. 5 is an exemplary circuit diagram of a gate driver of a display device according to an exemplary embodiment of the present disclosure.

FIG. 5 is an exemplary circuit diagram of a gate driver of a display device according to an exemplary embodiment of the present disclosure. In FIG. 5, for the convenience of description, even though an emission driver EM(n) of the gate driver is illustrated, the remaining gate drivers may also be configured with the same circuit.

Referring to FIG. 5, the emission driver EM(n) includes a QB node controller 141, a Q node controller 142, a stabilizer circuit 143, a pull-down circuit 144, and a pull-up circuit 145. The QB node controller 141 may control a voltage of the QB node QB in accordance with a clock signal CLK(n) and a start signal VST.

When an output signal EMO is a turn-off voltage, the QB node controller 141 may apply a first voltage which is applied to the first voltage line by the clock signal CLK(n)

and the start signal VST to the QB node QB. Here, the first voltage may be a gate low voltage VEL which is supplied to the gate low voltage line. In order to apply a full gate low voltage VEL to the QB node QB, a first capacitor CQB may be used.

When an output signal EMO is a turn-on voltage, the QB node controller 141 may apply a second voltage which is applied to the second voltage line by the clock signal CLK(n) and the start signal VST to the QB node QB. Here, the second voltage may be a gate high voltage VEH which is supplied to the gate high voltage line.

In one embodiment, the QB node controller 141 includes a first transistor T1, a second transistor T2, a third transistor T3, and a fourth transistor T4.

The first transistor T1 may be connected to a clock signal line to which the clock signal CLK(n) is supplied and the QP node QP. For example, a source electrode and a gate electrode of the first transistor T1 are connected to the clock signal line to which the clock signal CLK(n) is supplied and the drain electrode may be connected to the QP node QP. The first transistor T1 may be a p-type MOSFET (PMOS) or may be implemented by a low temperature polycrystalline silicon (LTPS) thin film transistor. Therefore, the first transistor T1 may apply a low level of clock signal CLK(n) to the QP node QP in response to a low level of clock signal CLK(n) which is a turn-on voltage.

The second transistor T2 may be connected to the gate high voltage line to which the gate high voltage VEH is supplied and the QP node QP. For example, a source electrode of the second transistor T2 is connected to the gate high voltage line to which the gate high voltage VEH is supplied and a drain electrode may be connected to the QP node QP and the drain electrode of the first transistor T1. Further, a gate electrode of the second transistor T2 may be connected to a start signal line to which the start signal VST is supplied. The second transistor T2 may be a p-type MOSFET (PMOS) or may be implemented by a low temperature polycrystalline silicon (LTPS) thin film transistor. Therefore, the second transistor T2 may apply the gate high voltage VEH to the QP node QP in response to a low level of start signal VST which is a turn-on voltage.

The third transistor T3 may be connected to the gate low voltage line to which the gate low voltage VEL is supplied and the QB node QB. For example, a source electrode of the third transistor T3 is connected to the gate low voltage line to which the gate low voltage VEL is supplied and a drain electrode may be connected to the QB node QB. Further, the gate electrode of the third transistor T3 may be connected to the QP node QP, the drain electrode of the first transistor T1, and the source electrode of the second transistor T2. The third transistor T3 may be a p-type MOSFET (PMOS) or may be implemented by a low temperature polycrystalline silicon (LTPS) thin film transistor. Therefore, when a voltage applied to the QP node QP is a low level voltage which is a turn-on voltage, the third transistor T3 may apply the gate low voltage VEL to the QB node QB.

The fourth transistor T4 may be connected to the gate high voltage line to which the gate high voltage VEH is supplied and the QB node QB. For example, a source electrode of the fourth transistor T4 is connected to the gate high voltage line to which the gate high voltage VEH is supplied and a drain electrode may be connected to the QB node QB and the drain electrode of the third transistor T3. Further, the gate electrode of the fourth transistor T4 may be connected to the Q1 node Q1. The fourth transistor T4 may be a p-type MOSFET (PMOS) or may be implemented by a low temperature polycrystalline silicon (LTPS) thin film transistor. Therefore, when a voltage applied to the Q1 node Q1 is a low level voltage which is a turn-on voltage, the fourth transistor T4 may apply the gate high voltage VEH to the QB node QB. The QB node controller 141 further includes a first capacitor CQB.

The first capacitor CQB may be connected to the gate high voltage line to which the gate high voltage VEH is supplied and the QB node QB. For example, a first electrode of the first capacitor CQB is connected to the gate high voltage line to which the gate high voltage VEH is supplied and a second electrode may be connected to the QB node QB. That is, the first capacitor CQB is connected between the gate high voltage line to which the gate high voltage VEH is supplied and the QB node QB to maintain a voltage which is applied to the QB node QB for a predetermined period.

The Q node controller 142 may control a voltage of the Q nodes Q1 and Q2 in accordance with the start signal VST and the clock signal CLK(n).

When the output signal EMO is a turn-on voltage, the Q node controller 142 may apply a gate low voltage of the start signal VST to the Q1 node Q1 by the gate low voltage of the clock signal CLK(n). Further, when the output signal EMO is a turn-off voltage, the Q node controller 142 may apply a gate high voltage of the start signal VST to the Q1 node Q1 by the gate low voltage of the clock signal CLK(n). The Q node controller 142 includes a fifth transistor T5.

The fifth transistor T5 may be connected to a start signal line to which the start signal VST is supplied and the Q1 node Q1. For example, a source electrode of the fifth transistor T5 is connected to the start signal line to which the start signal VST is supplied and a drain electrode may be connected to the Q1 node Q1 and the gate electrode of the fourth transistor T4. Further, a gate electrode of the fifth transistor T5 may be connected to a clock signal line to which the clock signal CLK(n) is supplied, the gate electrode of the first transistor T1 and the source electrode of the first transistor T1. The fifth transistor T5 may be a p-type MOSFET (PMOS) or may be implemented by a low temperature polycrystalline silicon (LTPS) thin film transistor. Therefore, when the clock signal CLK(n) applied to the clock signal line to which the clock signal CLK(n) is supplied is a low level voltage which is a turn-on voltage, the fifth transistor T5 may apply the start signal VST to the Q1 node Q1.

The stabilizer circuit 143 include a sixth transistor T6.

The Q node includes a Q1 node Q1 and a Q2 node Q2 and the sixth transistor T6 may be connected between the Q1 node Q1 and the Q2 node Q2. For example, a source electrode of the sixth transistor T6 is connected to the Q1 node Q1 and the gate electrode of the fourth transistor T4 and a drain electrode may be connected to the Q2 node Q2 and a second capacitor CQ. Further, a gate electrode of the sixth transistor T6 may be connected to the gate low voltage line to which the gate low voltage VEL is supplied and the source electrode of the seventh transistor T7. The sixth transistor T6 may be a p-type MOSFET (PMOS) or may be implemented by a low temperature polycrystalline silicon (LTPS) thin film transistor. Therefore, the sixth transistor T6 maintains a turn-on state by the gate low voltage VEL which is supplied to the gate low voltage line to apply a voltage which is applied to the Q1 node Q1 to the Q2 node Q2.

Therefore, when the Q2 node Q2 is bootstrapped, a channel current of the sixth transistor T6 becomes zero. That is, the sixth transistor T6 is turned off while bootstrapping the Q2 node Q2, to cut the electric connection of the Q1 node Q1 and the Q2 node Q2. Further, the sixth transistor is turned on while the Q2 node Q2 is not bootstrapped to electrically connect the Q1 node Q1 and the Q2 node Q2.

The stabilizer circuit 143 does not allow the voltage of the Q1 node Q1 to sharply change while the Q2 node Q2 is bootstrapped to reduce an electric stress applied to the fifth transistor T5 and the fourth transistor T4.

The pull-down circuit 144 may output a first voltage which is applied to the first voltage line in accordance with the voltage of the Q2 node Q2 as a gate signal.

The pull-down circuit 144 includes a seventh transistor T7 and a second capacitor CQ.

The seventh transistor T7 may be connected to the gate low voltage line to which the gate low voltage VEL is supplied and an output terminal to which the output signal EMO is output. For example, a source electrode of the seventh transistor T7 is connected to the gate low voltage line to which the gate low voltage VEL is supplied and a drain electrode may be connected to the output terminal and the second capacitor CQ. Further, the gate electrode of the seventh transistor T7 may be connected to the Q2 node Q2. The seventh transistor T7 may be a p-type MOSFET (PMOS) or may be implemented by a low temperature polycrystalline silicon (LTPS) thin film transistor. Therefore, when a voltage of the Q2 node Q2 is a low level voltage which is a turn-on voltage, the seventh transistor T7 may output the gate low voltage VEL as an output signal EMO.

The second capacitor CQ may be connected between the Q2 node Q2 and an output terminal to which the output signal EMO is output. For example, the first electrode of the second capacitor CQ is connected to the Q2 node Q2 and the second electrode may be connected to the output terminal to which the output signal EMO is output. Therefore, when the output signal EMO is changed from the gate high voltage VEH to the gate low voltage VEL, the second capacitor CQ bootstraps the Q2 node Q2 by reflecting the voltage change of the output terminal to the Q2 node Q2.

The pull-up circuit 145 may output a second voltage which is applied to the second voltage line in accordance with the voltage of the QB node QB as a gate signal.

The pull-up circuit 145 include an eighth transistor T8.

The eighth transistor T8 may be connected between the gate high voltage line to which the gate high voltage VEH is supplied and an output terminal to which the output signal EMO is output. For example, a source electrode of the eighth transistor T8 is connected to the gate high voltage line to which the gate high voltage VEH is supplied and a drain electrode may be connected to the output terminal. Further, the gate electrode of the eighth transistor T8 may be connected to the QB node QB, the first capacitor CQ, the drain electrode of the fourth transistor T4, and the drain electrode of the third transistor T3. The eighth transistor T8 may be a p-type MOSFET (PMOS) or may be implemented by a low temperature polycrystalline silicon (LTPS) thin film transistor. Therefore, when a voltage of the QB node QB is a low level voltage which is a turn-on voltage, the eighth transistor T8 may output the gate high voltage VEH as an output signal EMO.

Figure 6:
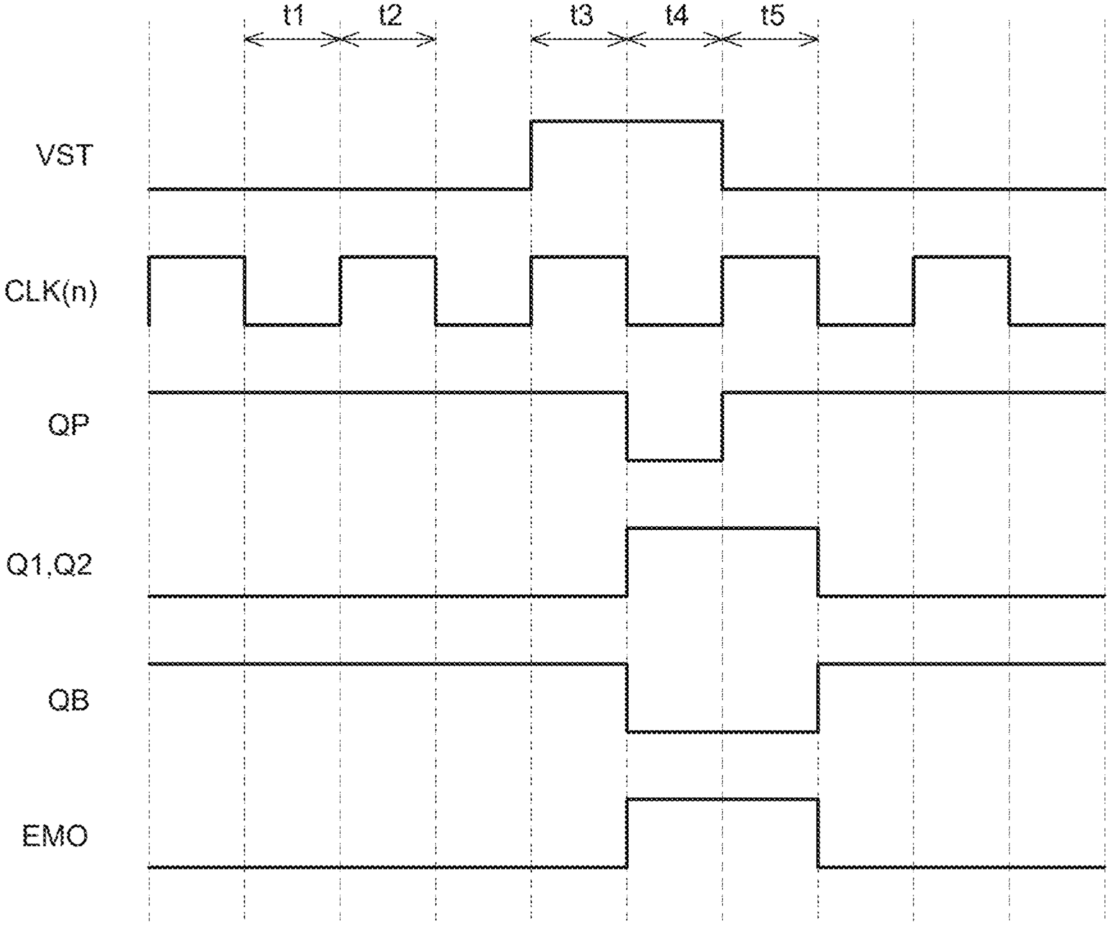
FIG. 6 is a waveform of a gate driver of a display device according to an exemplary embodiment of the present disclosure.

FIG. 6 is a waveform of a gate driver of a display device according to an exemplary embodiment of the present disclosure. FIGS. 7A to 7E are exemplary circuit diagrams illustrating an operation of a gate driver of FIG. 6 according to an exemplary embodiment of the present disclosure. FIG. 6 is a waveform for a start signal VST and a clock signal CLK(n) which are applied to a circuit during the operation of the circuit of FIG. 5, an output signal EMO output from the circuit, signals applied to a QP node QP, a Q2 node Q2, and a QB node QB in the circuit. In FIG. 6, for the convenience of description, a first stage in which the start signal VST is input will be described as an example.

Figure 7A:
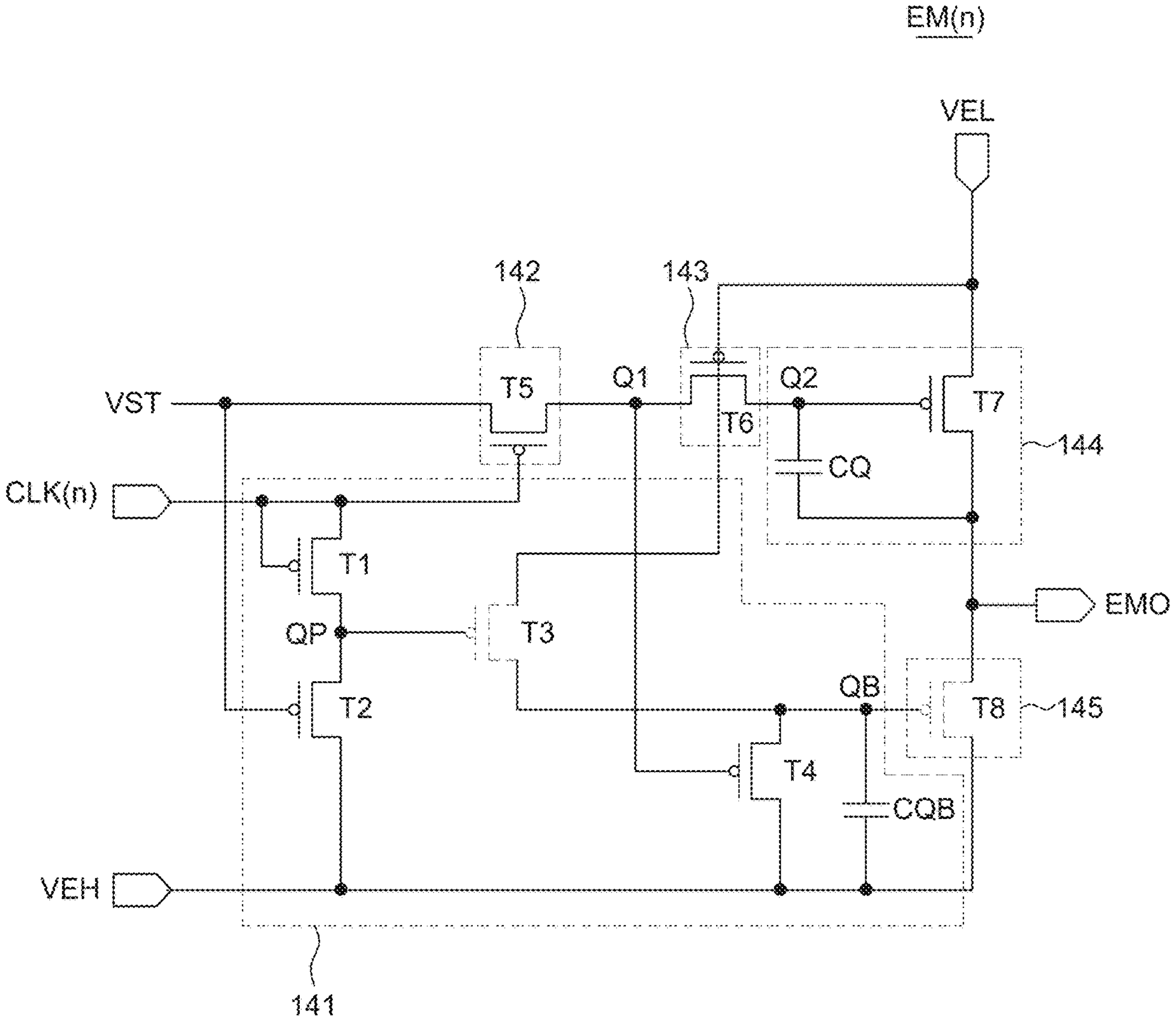
FIGS. 7A to 7E are exemplary circuit diagrams illustrating an operation of a gate driver of FIG. 6 according to an exemplary embodiment of the present disclosure.

Referring to FIGS. 6 and 7A, when a low level of start signal VST and a low level of clock signal CLK(n) are input in a first period t1, the first transistor T1, the second transistor T2, and a fifth transistor T5 are turned on. Therefore, the gate high voltage VEH is applied to the QP node QP and the third transistor T3 is turned off. Further, the sixth transistor T6 is always turned on by the gate low voltage VEL so that the low level of start signal VST is applied to the Q1 node Q1 and the Q2 node Q2. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the first period t1.

Figure 7B:
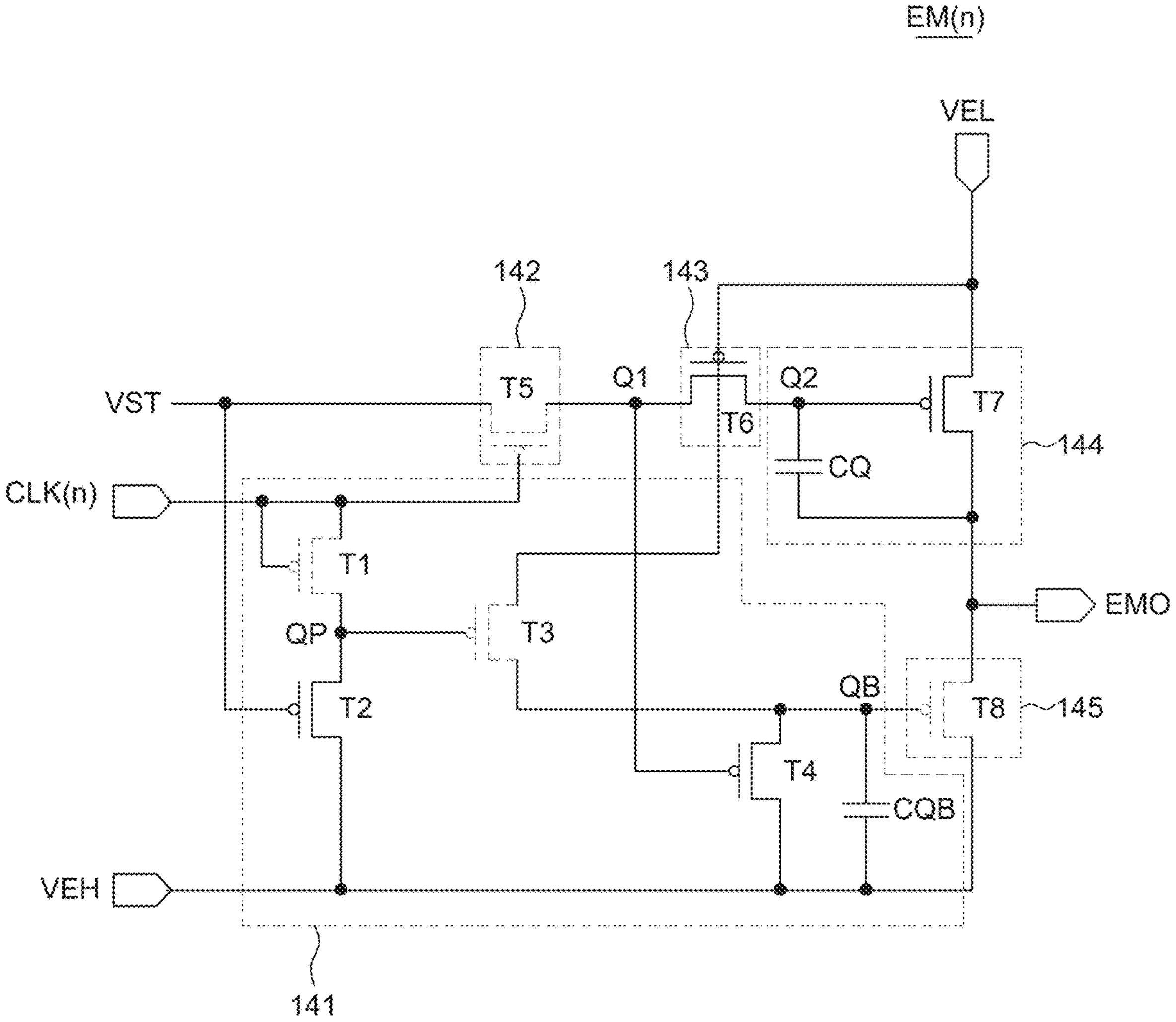

Referring to FIGS. 6 and 7B, when a low level of start signal VST and a high level of clock signal CLK(n) are input in a second period t2, the first transistor T1 and the fifth transistor T5 are turned off and the second transistor T2 is turned on. Therefore, the gate high voltage VEH is applied to the QP node QP and the third transistor T3 is turned off. Further, the sixth transistor T6 is always turned on by the gate low voltage VEL so that the Q1 node Q1 and the Q2 node Q2 are floated with the low level of start signal VST applied. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the second period t2.

Figure 7C:
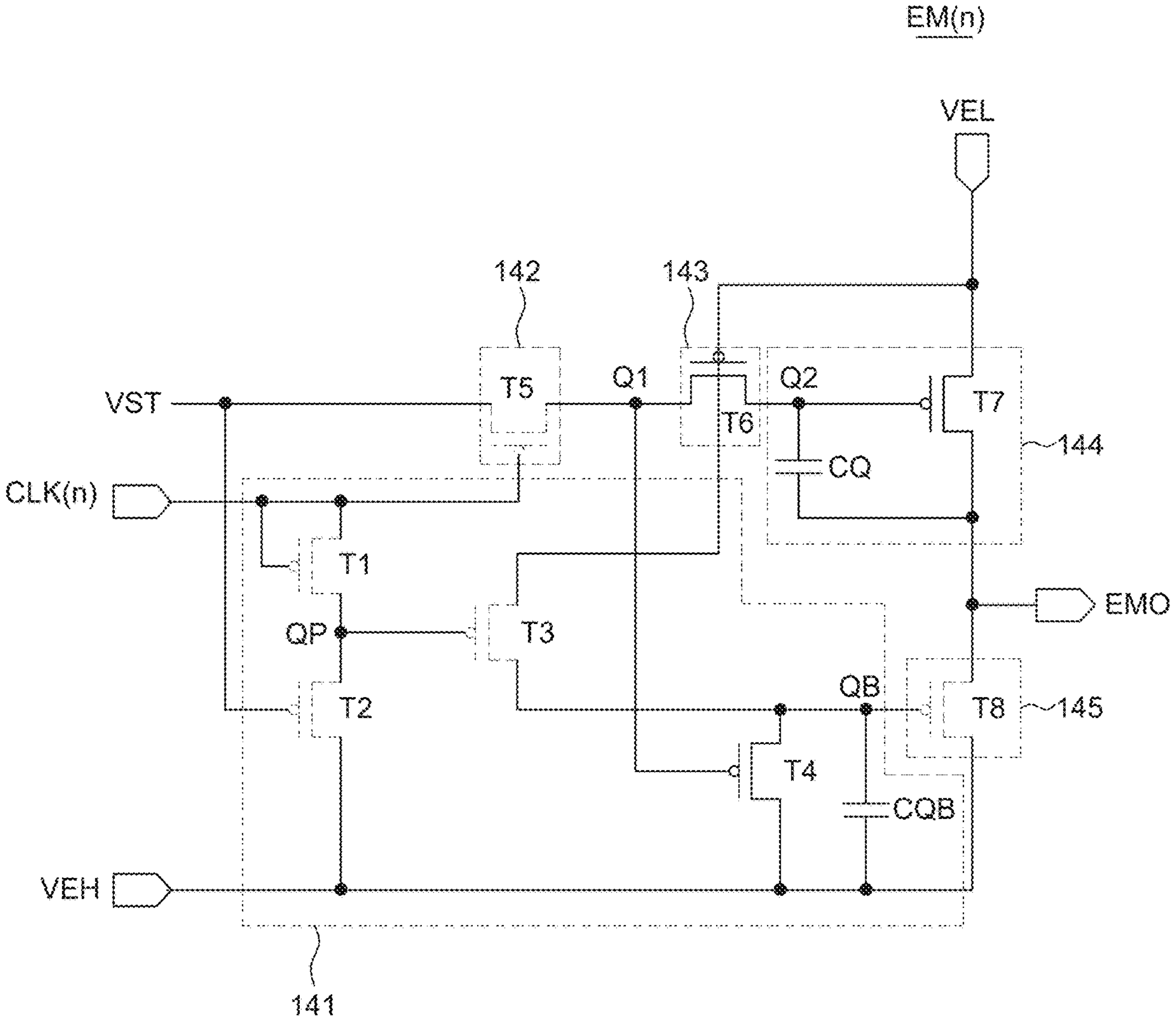

Referring to FIGS. 6 and 7C, when a high level of start signal VST and a high level of clock signal CLK(n) are input in a third period t3, the first transistor T1, the second transistor T2, and the fifth transistor T5 are turned off. Therefore, the QP node QP is floated with the gate high voltage VEH applied and the third transistor T3 is turned off. Further, the sixth transistor T6 is always turned on by the gate low voltage VEL so that the Q1 node Q1 and the Q2 node Q2 are floated with the low level of start signal VST applied. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the third period t3.

Figure 7D:
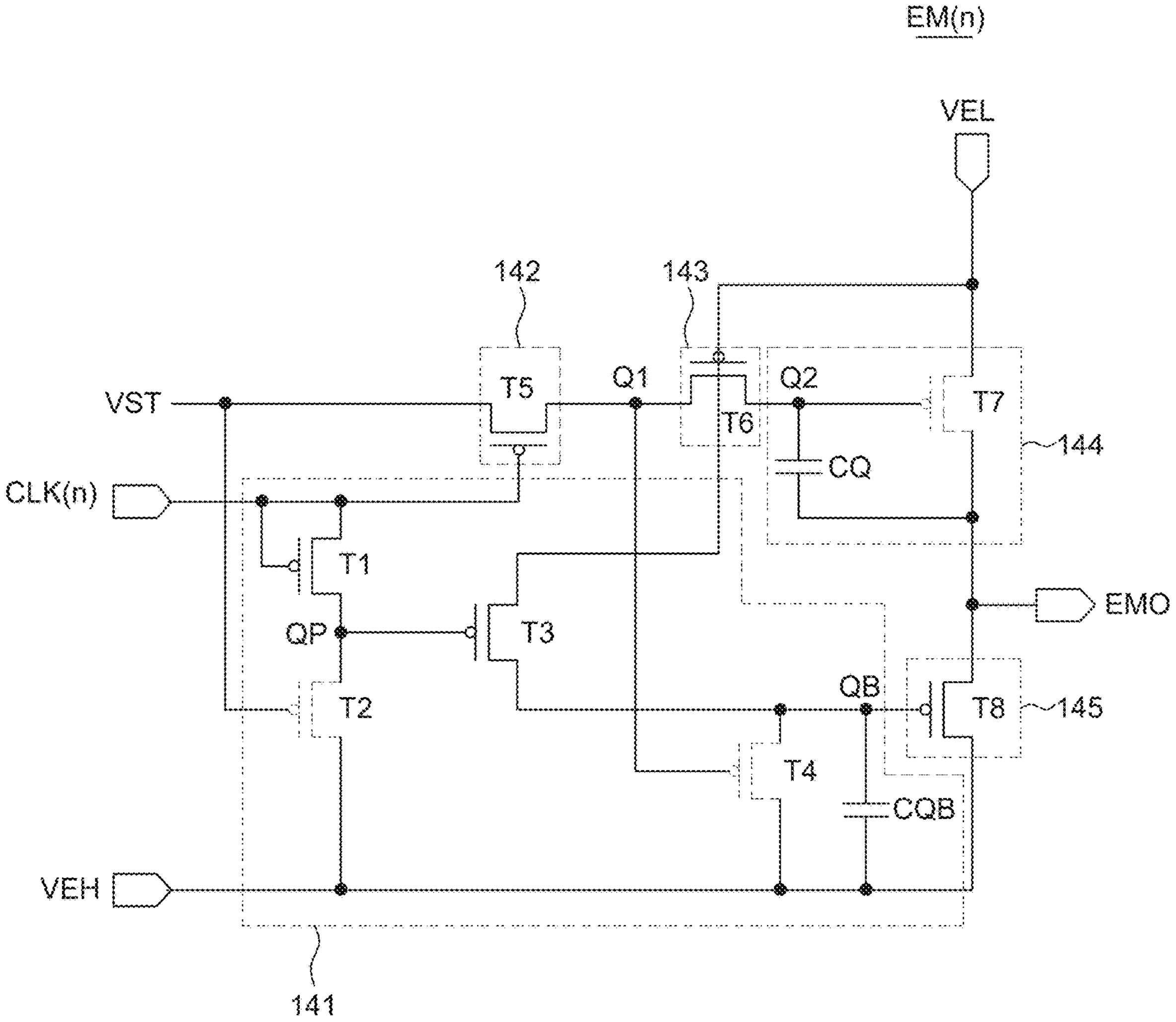

Referring to FIGS. 6 and 7D, when a high level of start signal VST and a low level of clock signal CLK(n) are input in a fourth period t4, the first transistor T1 and the fifth transistor T5 are turned on and the second transistor T2 is turned off. Therefore, the low level of clock signal CLK(n) is applied to the QP node QP to turn on the third transistor T3 and the gate low voltage VEL is applied to the QB node QB to turn on the eighth transistor T8. Further, the sixth transistor T6 is always turned on by the gate low voltage VEL so that the high level of start signal VST is applied to the Q1 node Q1 and the Q2 node Q2. The fourth transistor T4 is turned off by the high level of start signal VST applied to the Q1 node Q1. The eighth transistor T8 is turned on by the gate low voltage VEL applied to the QB node QB. Further, the seventh transistor T7 is turned off by the high level of start signal VST applied to the Q2 node Q2. Accordingly, the gate high voltage VEH is output as an output signal EMO in the fourth period t4.

Figure 7E:
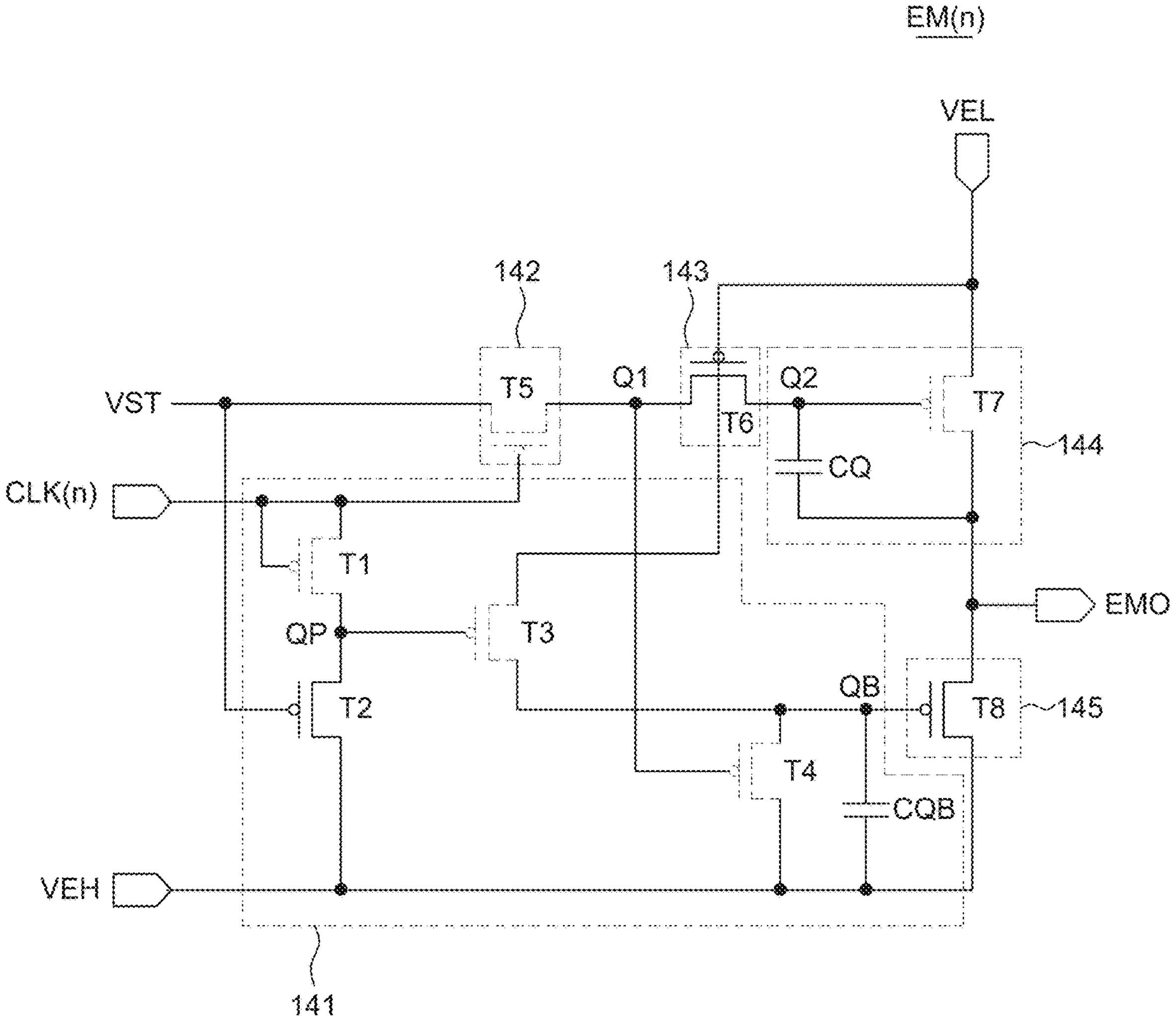

Referring to FIGS. 6 and 7E, when a low level of start signal VST and a high level of clock signal CLK(n) are input in a fifth period t5, the first transistor T1 and the fifth transistor T5 are turned off and the second transistor T2 is turned on. Therefore, the gate high voltage VEH is applied to the QP node QP to turn off the third transistor T3 and the QB node QB is floated with the gate low voltage VEL applied to turn on the eighth transistor T8. Further, the sixth transistor T6 is always turned on by the gate low voltage VEL so that the Q1 node Q1 and the Q2 node Q2 are floated with the high level of start signal VST applied. The fourth transistor T4 is turned off by the high level of start signal VST applied to the Q1 node Q1. The eighth transistor T8 is turned on by the gate low voltage VEL applied to the QB node QB. Further, the seventh transistor T7 is turned off by the high level of start signal VST applied to the Q2 node Q2. Accordingly, the gate high voltage VEH is output as an output signal EMO in the fifth period t5.

In the display device, the gate driver is disposed in the non-active area in the vicinity of the active area so that there is a problem in that the area of the non-active area inevitably increases, which increases the bezel.

Therefore, in the display device 100 according to the exemplary embodiment of the present disclosure, the gate driver 140 is disposed in the active area AA and supplies the scan signals Scan1 to Scan4 and the emission signal EM to the pixel P connected to each gate line GL disposed in the row direction. Further, among gate link lines GLL which supply a gate control signal GCS, such as a clock signal, a gate high signal, a gate low signal, and a start signal, to the gate driver 140, a gate link line GLL2 extending in the row direction may be disposed in an upper edge of the active area AA. Accordingly, in the display device 100 according to the exemplary embodiment of the present disclosure, the gate driver 140 is disposed to be divided in the active area AA and the gate link line GLL2 extending in the row direction is disposed in the active area AA to minimize the non-active area NA. Therefore, the bezel of the display device 100 may be minimized.

Further, in the display device, the shift register circuit is used as the stage of the gate driver. However, the number of clock signals of the shift register circuit used to drive the display device is large and an output of a previous stage is input to drive the display device so that there is a problem of signal delay. Therefore, as a stage of the gate driver, an edge trigger circuit which outputs a signal during the falling edge of the clock signal is used. However, in the edge trigger circuit, a capacitor is connected to a line to which a clock signal is supplied. As compared with an example that the gate driver is disposed in the non-active area, when the gate driver is disposed in the active area, a plurality of gate drivers should be disposed to be divided so that more stages are disposed. When the plurality of gate drivers are divided, the larger the number of divided gate drivers, the less the delay of the gate signal which is output from the gate driver to be transmitted to the pixel. However, an operation signal line which transmits an operation signal to the divided gate drivers is increased so that there is a problem of increased load. Further, in accordance with the number of divided gate drivers, the number of capacitors connected to the clock signal line is increased in each gate driver so that there is a problem of increased power consumption.

Therefore, in the display device 100 according to the exemplary embodiment of the present disclosure, the gate driver 140 which is divided in the active area AA includes a first transistor T1 and a third transistor T3. The first transistor includes a gate electrode and a source electrode connected to a clock signal line to which the clock signal CLK(n) is supplied. The third transistor T3 is connected to a line to which the gate low voltage VEL is supplied and the QB node. Accordingly, in the display device 100 according to the exemplary embodiment of the present disclosure, the first transistor T1 is diode-connected to the clock signal line to which the clock signal CLK(n) is supplied and the third transistor T3 is connected to the line to which the gate low voltage VEL is supplied and the QB node. Therefore, a capacitor which causes a lot of power consumption is omitted so that the power consumption is reduced and the display device 100 may be driven with a low power.

Figure 8:
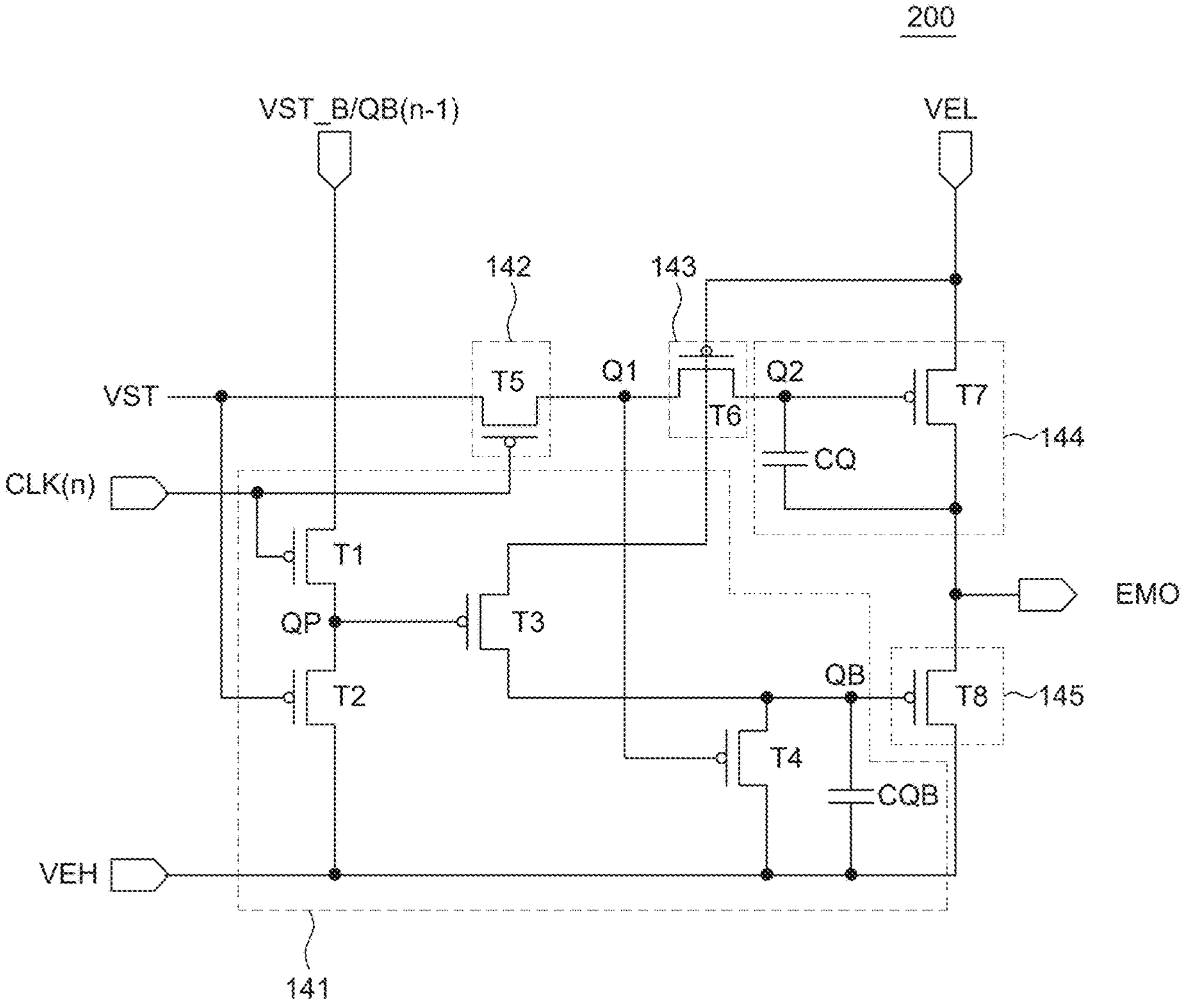
FIG. 8 is an exemplary circuit diagram of a gate driver of a display device according to another exemplary embodiment of the present disclosure.

FIG. 8 is an exemplary circuit diagram of a gate driver of a display device according to another exemplary embodiment of the present disclosure. The remaining configurations of FIG. 8 other than the first transistor T1 and the third transistor T3 are the same as FIG. 5 so that detailed description will be omitted.

Referring to FIG. 8, the first transistor T1 may be connected to one of an inverted start signal line to which an inverted start signal VST_B of a start signal VST is supplied or a line connected to a QB node QB of a previous stage and a QP node QP. For example, when the stage is a stage which is disposed first amongst the plurality of stages, a source electrode of the first transistor T1 may be connected to the inverted start signal line to which an inverted start signal VST_B which is an inverted signal of the start signal VST is supplied. Further, when the stage is a stage which is disposed second or later, the source electrode of the first transistor T1 may be connected to a line connected to the QB node QB of the previous stage. At this time, a waveform of the inverted start signal VST_B of the start signal VST may be the same as a waveform of a signal QB(n−1) input from a QB node QB of a previous stage. A drain electrode of the first transistor T1 may be connected to the QP node QP. A gate electrode of the first transistor T1 may be connected to a clock signal line to which the clock signal CLK(n) is supplied. Further, the first transistor T1 may be a p-type MOSFET (PMOS) or may be implemented by a low temperature polycrystalline silicon (LTPS) thin film transistor. Therefore, the first transistor T1 may apply an inverted start signal VST_B or a signal QB(n−1) applied to a QB node QB of a previous stage to the QP node QP in response to a low level of clock signal CLK(n) which is a turn-on voltage.

The third transistor T3 may be connected between the gate low voltage line to which the gate low voltage VEL is supplied and the QB node QB. For example, a source electrode of the third transistor T3 is connected to the gate low voltage line to which the gate low voltage VEL is supplied and the drain electrode may be connected to the QB node QB. Further, the gate electrode of the third transistor T3 may be connected to the QP node QP. The third transistor T3 may be a p-type MOSFET (PMOS) or may be implemented by a low temperature polycrystalline silicon (LTPS) thin film transistor. Therefore, when a voltage applied to the QP node QP is a low level voltage which is a turn-on voltage, the third transistor T3 may apply the gate low voltage VEL to the QB node QB.

Figure 9:
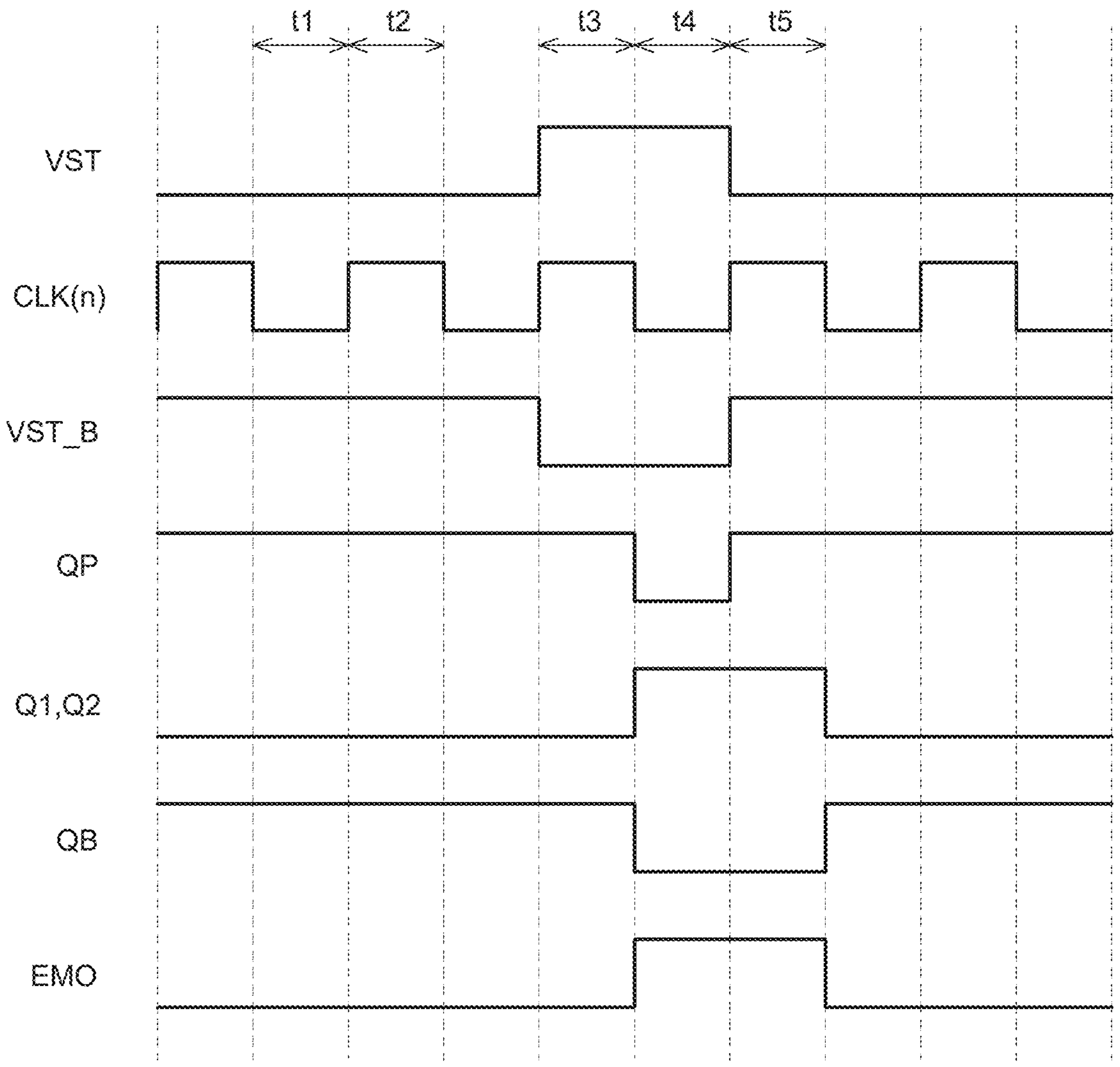
FIG. 9 is a waveform of a gate driver of a display device according to another exemplary embodiment of the present disclosure.

FIG. 9 is a waveform of a gate driver of a display device according to another exemplary embodiment of the present disclosure. FIGS. 10A to 10E are exemplary circuit diagrams illustrating an operation of a gate driver of FIG. 9. FIG. 9 is a waveform for a start signal VST, a clock signal CLK(n), and an inverted start signal VST_B which are applied to a circuit during the operation of the circuit of FIG. 8, an output signal EMO output from the circuit, signals applied to a QP node QP, a Q2 node Q2, and a QB node QB in the circuit. In FIG. 8, for the convenience of description, a first stage in which the start signal VST and the inverted start signal VST_B are input will be described as an example.

Figure 10A:
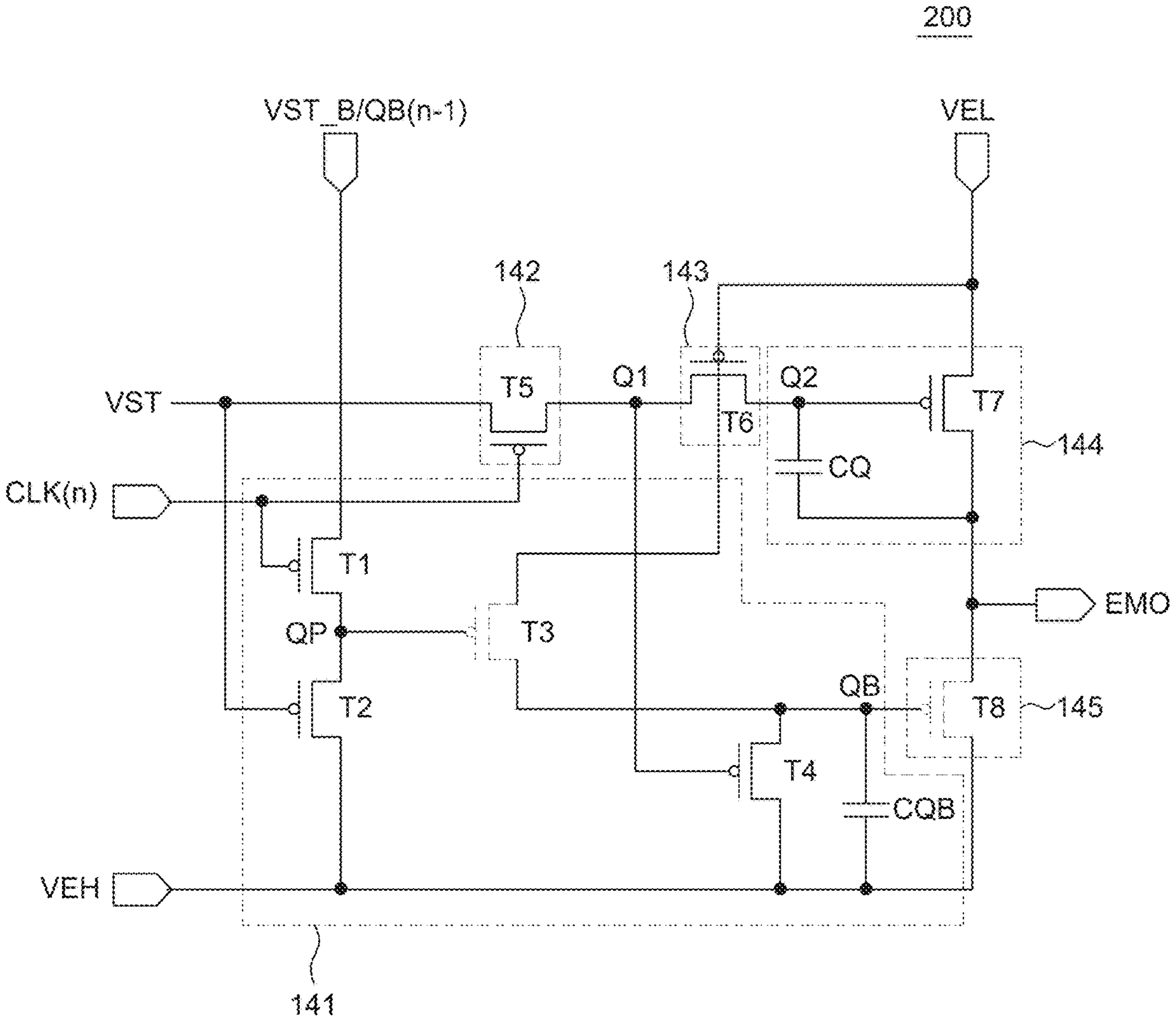
FIGS. 10A to 10E are exemplary circuit diagrams illustrating an operation of a gate driver of FIG. 9 according to an exemplary embodiment of the present disclosure.

Referring to FIGS. 9 and 10A, when a low level of start signal VST and a low level of clock signal CLK(n) are input in a first period t1, the first transistor T1 and the fifth transistor T5 are turned on. Therefore, a high level of inverted start signal VST_B and the gate high voltage VEH are applied to the QP node QP and the third transistor T3 is turned off. Further, the sixth transistor T6 is always turned on by the gate low voltage VEL so that the low level of start signal VST is applied to the Q1 node Q1 and the Q2 node Q2. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the first period t1.

Figure 10B:
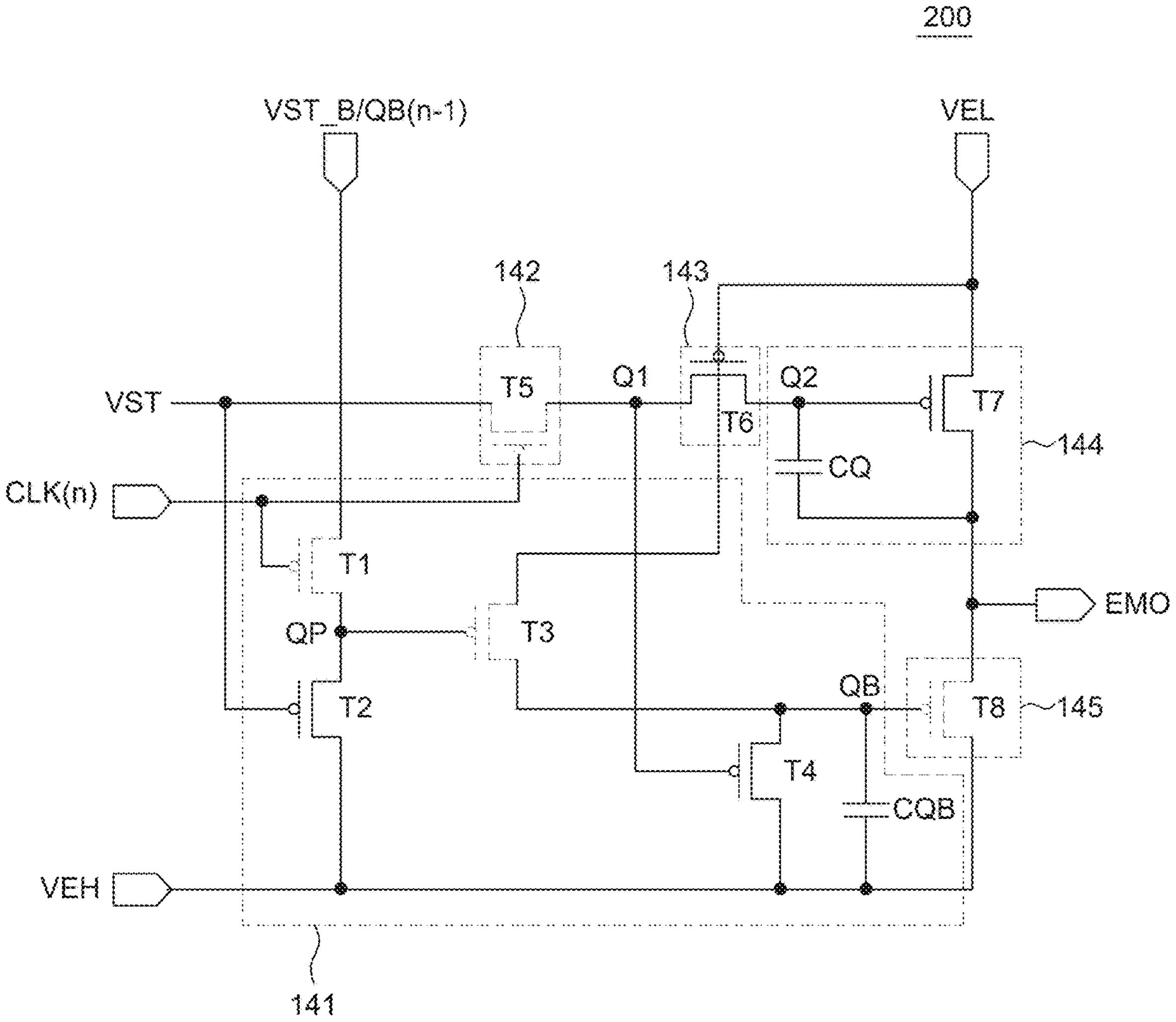

Referring to FIGS. 9 and 10B, when a low level of start signal VST and a high level of clock signal CLK(n) are input in a second period t2, the first transistor T1 and a fifth transistor T5 are turned off and the second transistor T2 is turned on. Therefore, the gate high voltage VEH is applied to the QP node QP and the third transistor T3 is turned off. Further, the sixth transistor T6 is always turned on by the gate low voltage VEL so that the Q1 node Q1 and the Q2 node Q2 are floated in a state in which the low level of start signal VST is applied. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the second period t2.

Figure 10C:
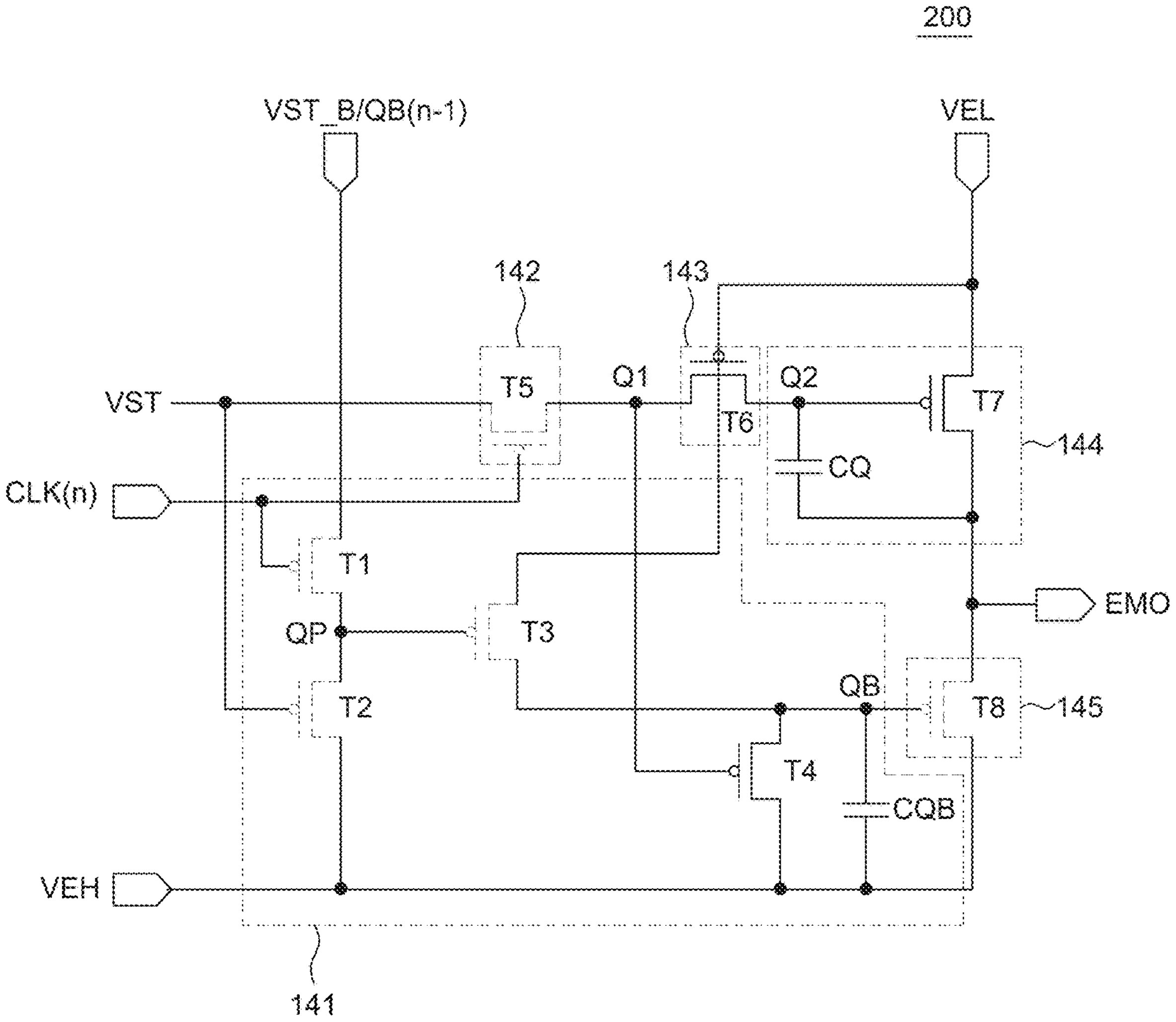

Referring to FIGS. 9 and 10C, when a high level of start signal VST and a high level of clock signal CLK(n) are input in a third period t3, the first transistor T1, the second transistor T2, and the fifth transistor T5 are turned off. Therefore, the QP node QP is floated with the gate high voltage VEH applied and the third transistor T3 is turned off. Further, the sixth transistor T6 is always turned on by the gate low voltage VEL so that the Q1 node Q1 and the Q2 node Q2 are floated in a state in which the low level of start signal VST is applied. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the third period t3.

Figure 10D:
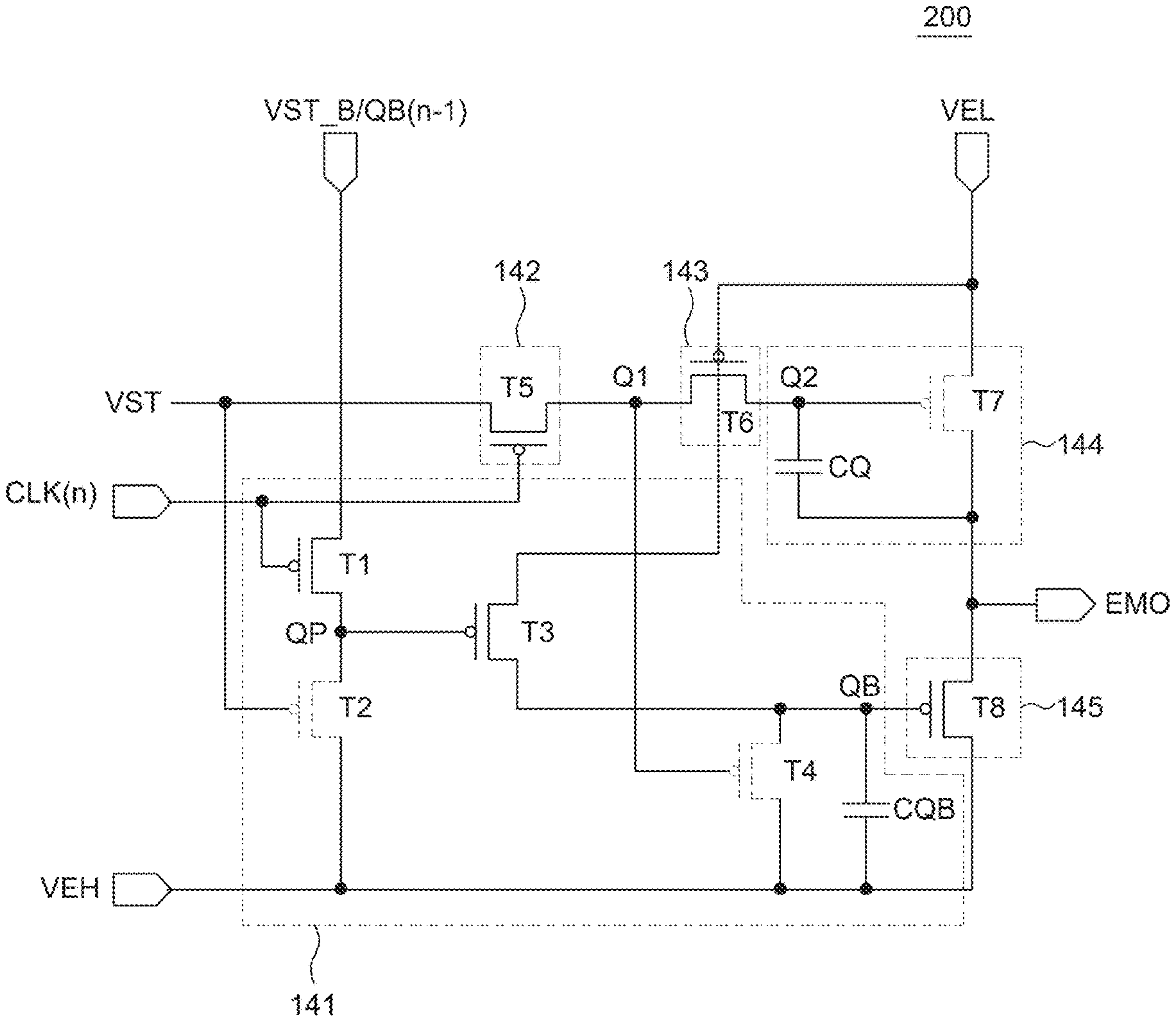

Referring to FIGS. 9 and 10D, when a high level of start signal VST and a low level of clock signal CLK(n) are input in a fourth period t4, the first transistor T1 and the fifth transistor T5 are turned on and the second transistor T2 is turned off. Therefore, the low level of inverted start signal VST_B is applied to the QP node QP to turn on the third transistor T3 and a low level of clock signal CLK(n) is applied to the QB node QB to turn on the eighth transistor T8. Further, the sixth transistor T6 is always turned on by the gate low voltage VEL so that the high level of start signal VST is applied to the Q1 node Q1 and the Q2 node Q2. The fourth transistor T4 is turned off by the high level of start signal VST applied to the Q1 node Q1. The eighth transistor T8 is turned on by the low level of clock signal CLK(n) applied to the QB node QB. Further, the seventh transistor T7 is turned off by the high level of start signal VST applied to the Q2 node Q2. Accordingly, the gate high voltage VEH is output as an output signal EMO in the fourth period t4.

Figure 10E:
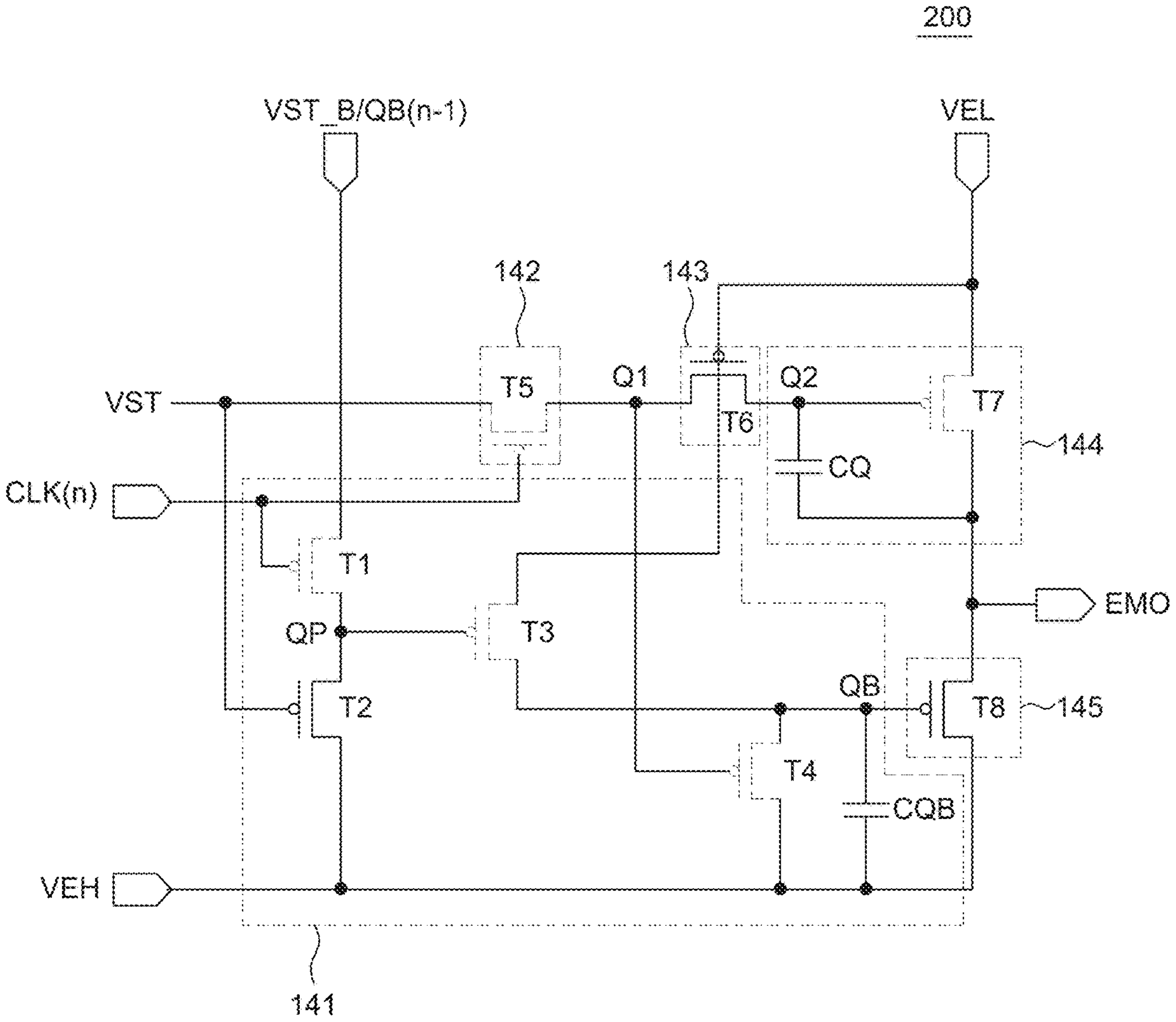

Referring to FIGS. 9 and 10E, when a low level of start signal VST and a high level of clock signal CLK(n) are input in a fifth period t5, the first transistor T1 and the fifth transistor T5 are turned off and the second transistor T2 is turned on. Therefore, the gate high voltage VEH is applied to the QP node QP to turn off the third transistor T3 and the QB node QB is floated with the low level of clock signal CLK(n) applied to turn on the eighth transistor T8. The sixth transistor T6 is always turned on by the gate low voltage VEL so that the Q1 node Q1 and the Q2 node Q2 are floated with the high level of start signal VST applied. The fourth transistor T4 is turned off by the high level of start signal VST applied to the Q1 node Q1. The eighth transistor T8 is turned on by the gate low voltage VEL applied to the QB node QB. Further, the seventh transistor T7 is turned off by the high level of start signal VST applied to the Q2 node Q2. Accordingly, the gate high voltage VEH is output as an output signal EMO in the fifth period t5.

Accordingly, in the display device 200 according to another exemplary embodiment of the present disclosure, the gate driver 140 is disposed to be divided in the active area AA and the gate link line GLL2 extending in the row direction is disposed in the active area AA to minimize the non-active area NA. Therefore, the bezel of the display device 200 may be minimized.

Further, in the display device 200 according to another exemplary embodiment of the present disclosure, the gate driver 140 which is disposed to be divided in the active area AA includes a first transistor T1. The first transistor includes a gate electrode connected to a clock signal line to which the clock signal CLK(n) is supplied and a source electrode to which an inverted start signal VST_B of the start signal VST or a QB node signal QB(n−1) of a previous stage is applied. Therefore, a capacitor which causes a lot of power consumption is omitted to reduce the power consumption, so that the display device 200 may be driven at a low power.

Figure 11:
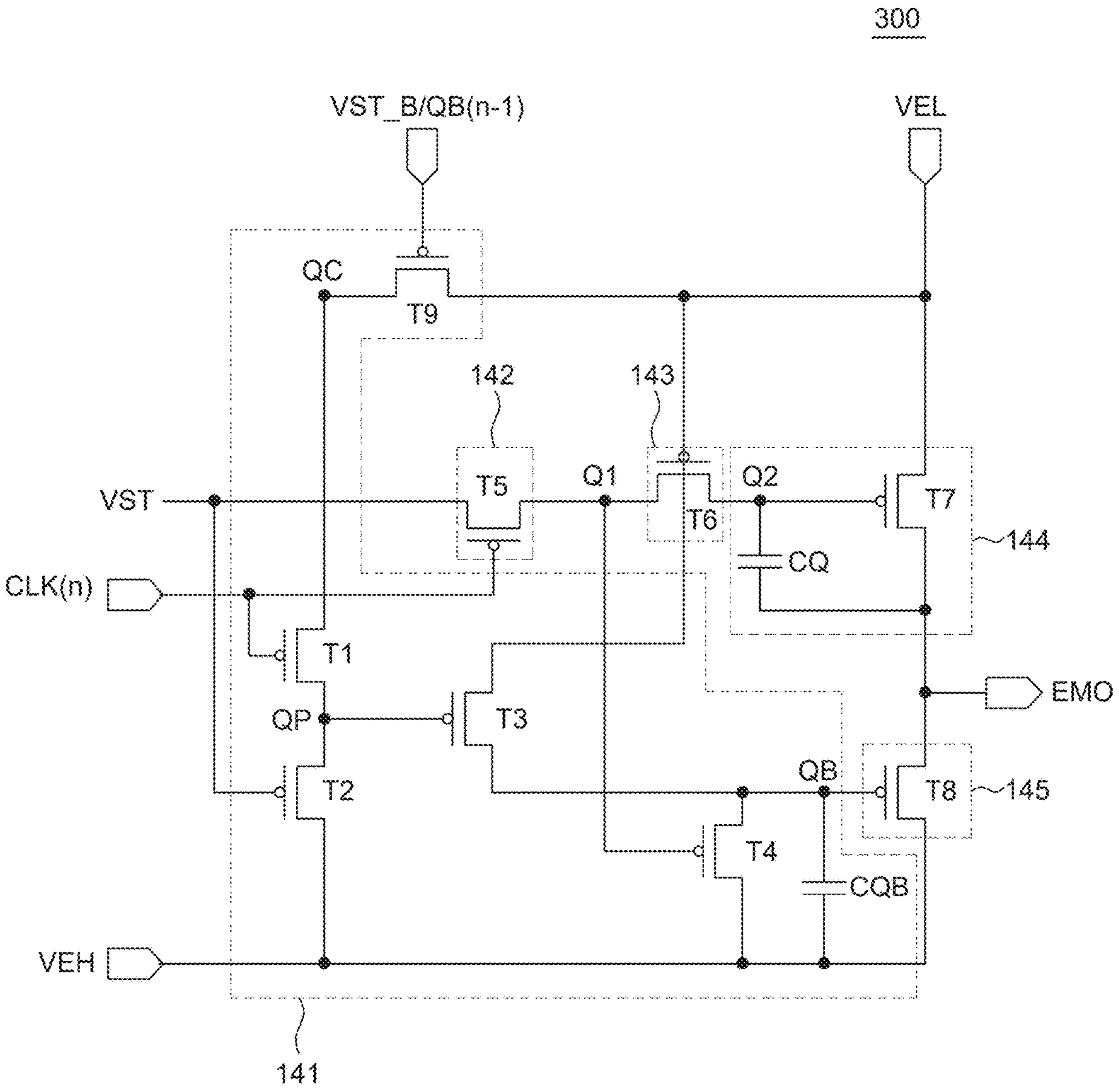
FIG. 11 is an exemplary circuit diagram of a gate driver of a display device according to still another exemplary embodiment of the present disclosure.

FIG. 11 is an exemplary circuit diagram of a gate driver of a display device according to still another exemplary embodiment of the present disclosure. The remaining configurations of FIG. 11 other than the first transistor T1 and the ninth transistor T9 are the same as FIG. 5 so that detailed description will be omitted.

Referring to FIG. 11, the first transistor T1 may be connected between a QC node QC and a QP node QP. For example, a source electrode of the first transistor T1 is connected to the QC node QC and a drain electrode is connected to the QP node QP. A gate electrode of the first transistor T1 may be connected to a clock signal line to which the clock signal CLK(n) is supplied. Further, the first transistor T1 may be a p-type MOSFET (PMOS) or may be implemented by a low temperature polycrystalline silicon (LTPS) thin film transistor. Therefore, the first transistor T1 may apply a voltage applied to the QC node QC to the QP node QP in response to a low level of clock signal CLK(n) which is a turn-on voltage.

The ninth transistor T9 may be connected to the gate low voltage line to which the gate low voltage VEL is supplied and the QC node QC. For example, a source electrode of the ninth transistor T9 is connected to the gate low voltage line to which the gate low voltage VEL is supplied and a drain electrode may be connected to the QC node QC. The gate electrode of the first transistor T1 is connected to one of an inverted start signal line to which an inverted start signal VST_B of a start signal VST is supplied or a line connected to a QB node QB of a previous stage. For example, when the stage is a stage which is disposed first amongst the plurality of stages, a gate electrode of the ninth transistor T9 may be connected to the inverted start signal line to which an inverted start signal VST_B which is an inverted signal of the start signal VST is supplied. Further, when the stage is a stage which is disposed second or later amongst the plurality of stages, the gate electrode of the ninth transistor T9 may be connected to a line connected to the QB node QB of the previous stage. At this time, a waveform of the inverted start signal VST_B of the start signal VST is the same as a waveform of a QB node signal input from a QB node QB of a previous stage. Further, the ninth transistor T9 may be a p-type MOSFET (PMOS) or may be implemented by a low temperature polycrystalline silicon (LTPS) thin film transistor. Therefore, the ninth transistor T9 may apply a gate low voltage VEL to the QC node QC in response to a low level of inverted start signal VST_B which is a turn-on voltage or the QB node signal QB(n−1) of a previous stage.

Figure 12:
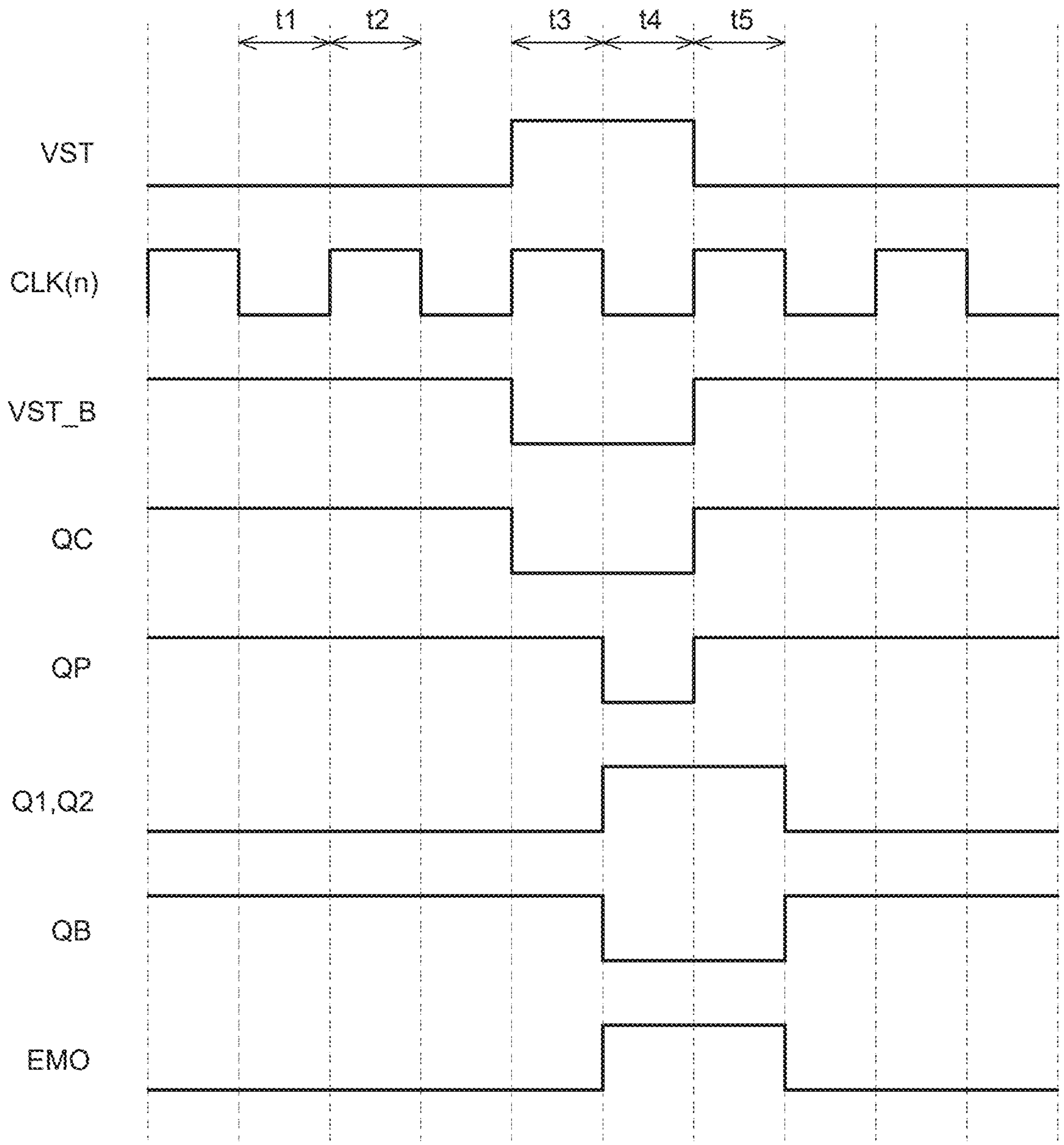
FIG. 12 is a waveform of a gate driver of a display device according to still another exemplary embodiment of the present disclosure.

FIG. 12 is a waveform of a gate driver of a display device according to still another exemplary embodiment of the present disclosure. FIGS. 13A to 13E are exemplary circuit diagrams illustrating an operation of a gate driver of FIG. 12. FIG. 12 is a waveform for a start signal VST, a clock signal CLK(n), and an inverted start signal VST_B which are applied to a circuit during the operation of the circuit of FIG. 11, an output signal EMO output from the circuit, signals applied to a QP node QP, a Q2 node Q2, a QC node QC and a QB node QB in the circuit. In FIG. 10, for the convenience of description, a first stage in which the start signal VST and the inverted start signal VST_B are input will be described as an example.

Figure 13A:
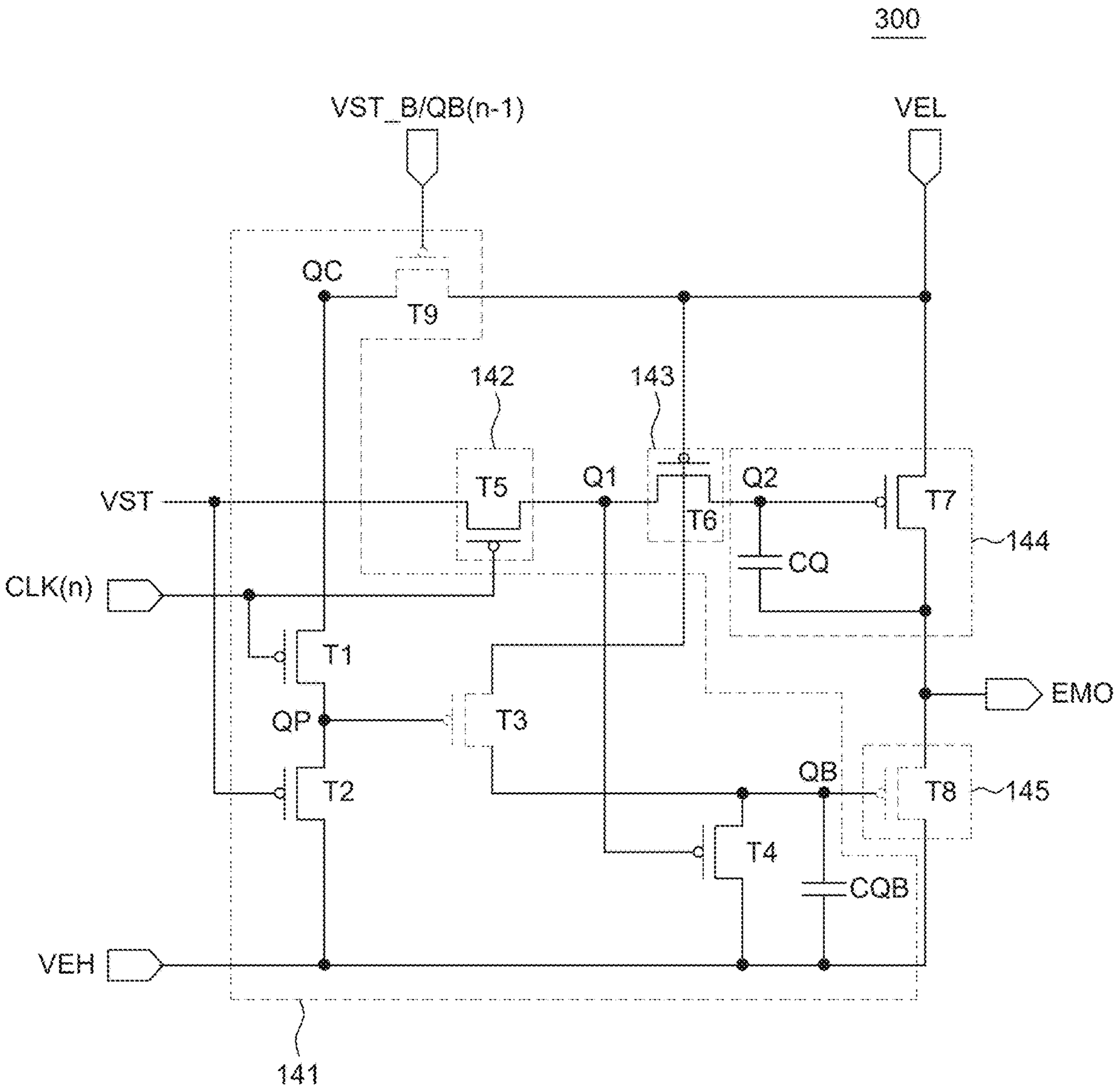
FIGS. 13A to 13E are exemplary circuit diagrams illustrating an operation of a gate driver of FIG. 12 according to an exemplary embodiment of the present disclosure.

Referring to FIGS. 12 and 13A, when a low level of start signal VST and a low level of clock signal CLK(n) are input in a first period t1, the first transistor T1, the second transistor T2, and a fifth transistor T5 are turned on. Further, when a high level of inverted start signal VST_B is input in a first period t1, the ninth transistor T9 is turned off. Therefore, the gate high voltage VEH is applied to the QP node QP and the QC node QC and the third transistor T3 is turned off. Further, the sixth transistor T6 is always turned on by the gate low voltage VEL so that the low level of start signal VST is applied to the Q1 node Q1 and the Q2 node Q2. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the first period t1.

Figure 13B:
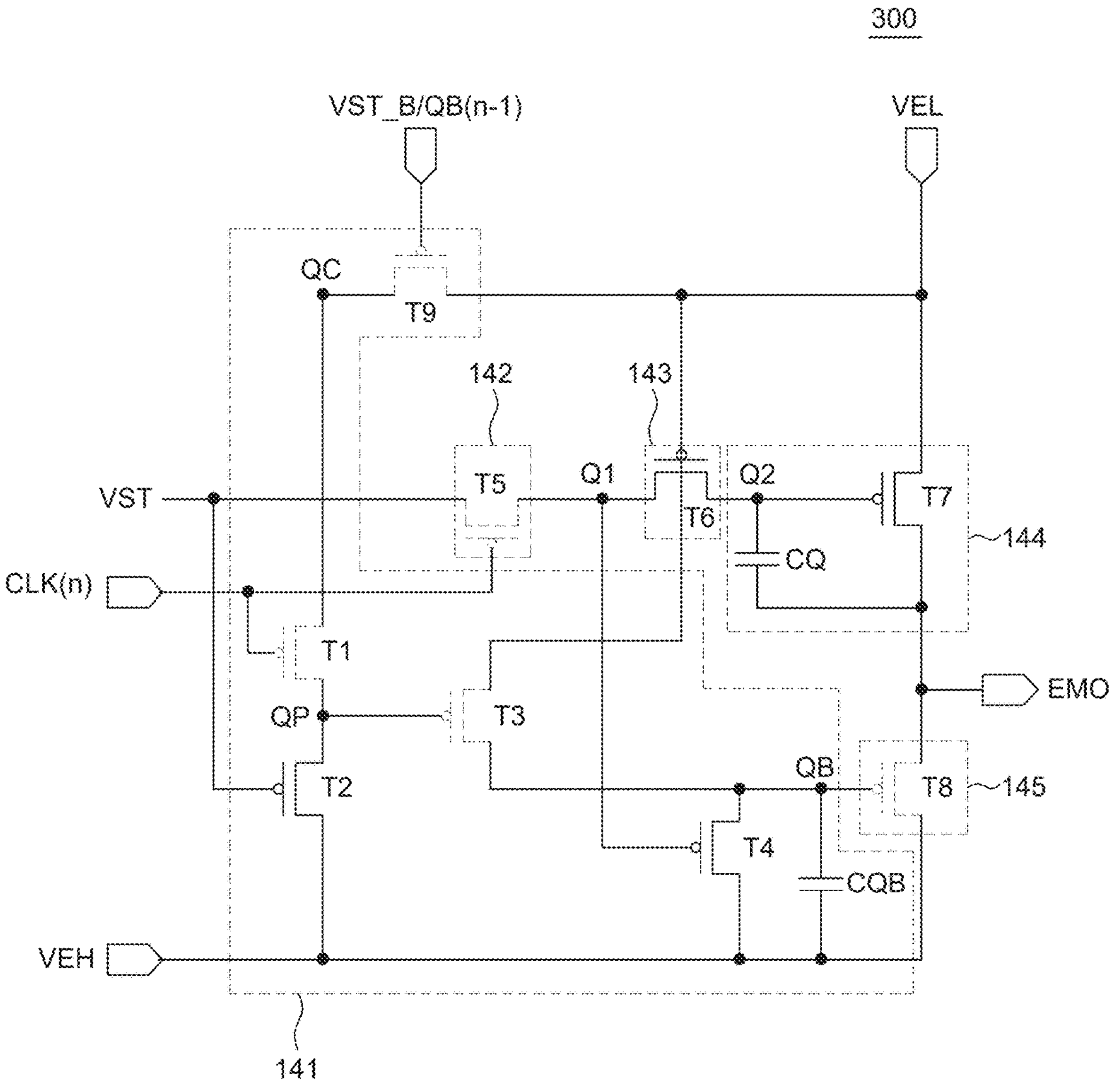

Referring to FIGS. 12 and 13B, when a low level of start signal VST and a high level of clock signal CLK(n) are input in a second period t2, the first transistor T1 and a fifth transistor T5 are turned off and the second transistor T2 is turned on. Therefore, the gate high voltage VEH is applied to the QP node QP and the third transistor T3 is turned off. Further, when a high level of inverted start signal VST_B is input in a second period t2, the ninth transistor T9 is turned off. At this time, the QC node QC is floated with a gate high voltage VEH applied. Further, the sixth transistor T6 is always turned on by the gate low voltage VEL so that the Q1 node Q1 and the Q2 node Q2 are floated in a state in which the low level of start signal VST is applied. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the second period t2.

Figure 13C:
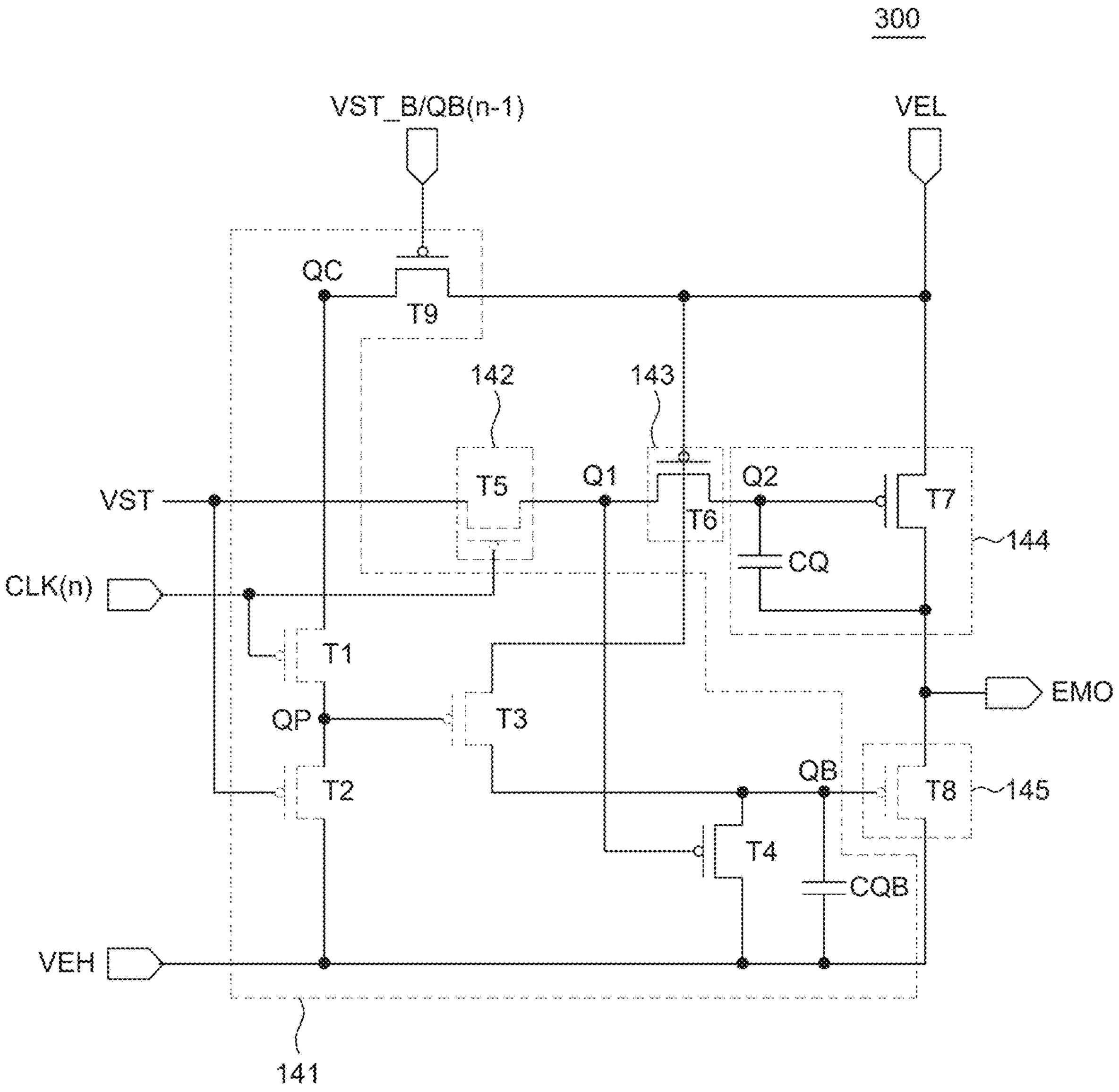

Referring to FIGS. 12 and 13C, when a high level of start signal VST and a high level of clock signal CLK(n) are input in a third period t3, the first transistor T1, the second transistor T2, and the fifth transistor T5 are turned off. Further, when a low level of inverted start signal VST_B is input in a third period t3, the ninth transistor T9 is turned on. Therefore, the QC node QC is floated with the gate low voltage VEL applied and the QP node QP is floated with the gate high voltage VEH applied so that the third transistor T3 is turned off. Further, the sixth transistor T6 is always turned on by the gate low voltage VEL so that the Q1 node Q1 and the Q2 node Q2 are floated in a state in which the low level of start signal VST is applied. The fourth transistor T4 is turned on by the low level of start signal VST applied to the Q1 node Q1 and the gate high voltage VEH is applied to the QB node QB. The eighth transistor T8 is turned off by the gate high voltage VEH applied to the QB node QB. Further, the seventh transistor T7 is turned on by the low level of start signal VST applied to the Q2 node Q2. Accordingly, the gate low voltage VEL is output as an output signal EMO in the third period t3.

Figure 13D:
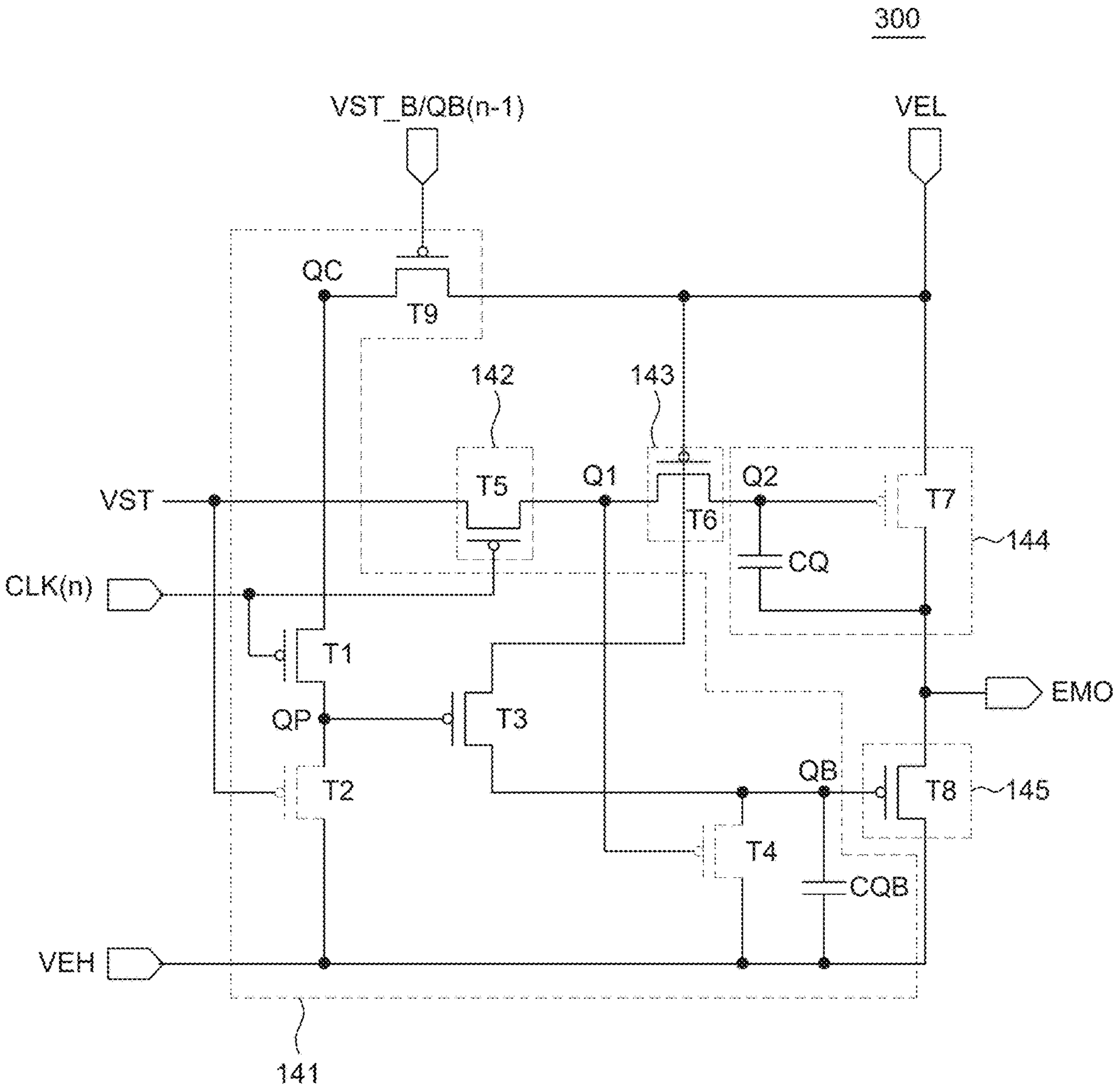

Referring to FIGS. 12 and 13D, when a high level of start signal VST and a low level of clock signal CLK(n) are input in a fourth period t4, the first transistor T1 and the fifth transistor T5 are turned on and the second transistor T2 is turned off. Further, when a low level of inverted start signal VST_B is input in a fourth period t4, the ninth transistor T9 is turned on. Therefore, the gate low voltage VEL is applied to the QC node QC and the QP node QP and the third transistor T3 is turned on. The gate low voltage VEL is applied to the QB node QB to turn on the eighth transistor T8. Further, the sixth transistor T6 is always turned on by the gate low voltage VEL so that the high level of start signal VST is applied to the Q1 node Q1 and the Q2 node Q2. The fourth transistor T4 is turned off by the high level of start signal VST applied to the Q1 node Q1. Further, the seventh transistor T7 is turned off by the high level of start signal VST applied to the Q2 node Q2. Accordingly, the gate high voltage VEH is output as an output signal EMO in the fourth period t4.

Figure 13E:
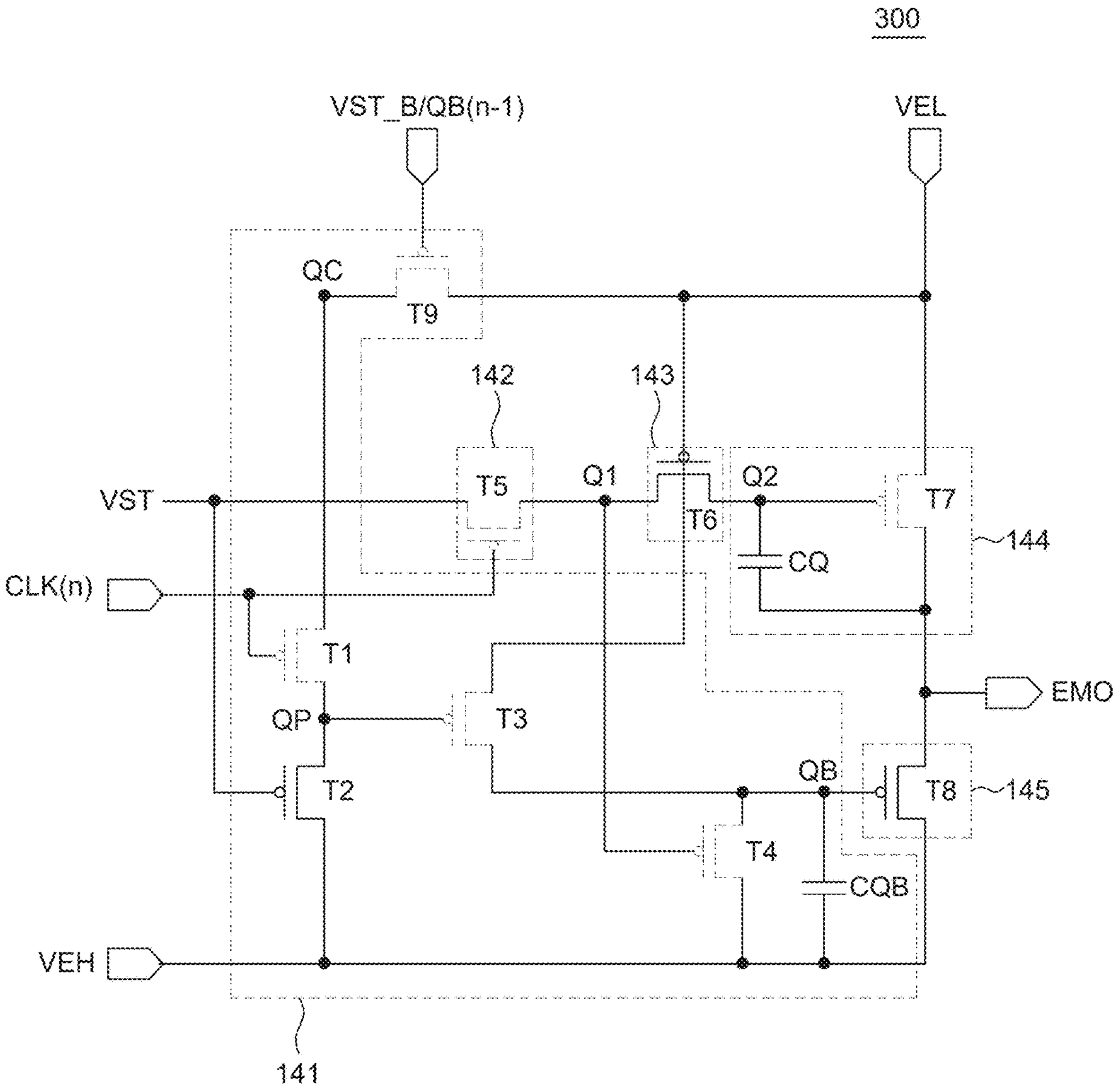

Referring to FIGS. 12 and 13E, when a low level of start signal VST and a high level of clock signal CLK(n) are input in a fifth period t5, the first transistor T1 and the fifth transistor T5 are turned off and the second transistor T2 is turned on. Further, when a high level of inverted start signal VST_B is input in a fifth period t5, the ninth transistor T9 is turned off. Therefore, the QC node QC is floated with a gate low voltage VEL applied. The gate high voltage VEH is applied to the QP node QP to turn off the third transistor T3 and the QB node QB is floated with the gate low voltage VEL applied to turn on the eighth transistor T8. Further, the sixth transistor T6 is always turned on by the gate low voltage VEL so that the Q1 node Q1 and the Q2 node Q2 are floated with the high level of start signal VST applied. The fourth transistor T4 is turned off by the high level of start signal VST applied to the Q1 node Q1. Further, the seventh transistor T7 is turned off by the high level of start signal VST applied to the Q2 node Q2. Accordingly, the gate high voltage VEH is output as an output signal EMO in the fifth period t5.

Accordingly, in the display device 300 according to another exemplary embodiment of the present disclosure, the gate driver 140 is divided in the active area AA and the gate link line GLL2 extending in the row direction is disposed in the active area AA to minimize the non-active area NA. Therefore, the bezel of the display device 300 may be minimized.

Further, in the display device 300 according to another exemplary embodiment of the present disclosure, the gate driver 140 which is disposed to be divided in the active area AA includes a first transistor T1. The first transistor includes a gate electrode connected to a clock signal line to which the clock signal CLK(n) is supplied and a source electrode to which an inverted start signal VST_B of the start signal VST or a QB node signal QB(n−1) of a previous stage is applied. Accordingly, in the display device 200 according to another exemplary embodiment of the present disclosure, a first transistor T1 includes a gate electrode is connected to a clock signal line to which the clock signal CLK(n) is supplied and a source electrode to which an inverted start signal VST_B of the start signal VST or a QB node signal QB(n−1) of a previous stage is applied. Therefore, a capacitor which causes a lot of power consumption is omitted to reduce the power consumption, so that the display device 200 may be driven at a low power.

Accordingly, in the display device 300 according to still another exemplary embodiment of the present disclosure, the gate driver 140 is disposed to be divided in the active area AA and the gate link line GLL2 extending in the row direction is disposed in the active area AA to minimize the non-active area NA. Therefore, the bezel of the display device 300 may be minimized.

Further, in the display device 300 according to still another exemplary embodiment of the present disclosure, a gate driver 140 which is divided in the active area AA includes a first transistor T1 and a ninth transistor T9. The first transistor T1 includes a gate electrode connected to a clock signal line to which the clock signal CLK(n) is supplied and is connected between a QC node QC and a QP node QP. The ninth transistor T9 includes a gate electrode which is connected to one of an inverted start signal line to which an inverted start signal VST_B of the start signal VST or a line connected to a QB node of a previous stage and is connected between a gate low voltage line to which the gate low voltage VEL is supplied and the QC node QC. Accordingly, in the display device 300 according to still another exemplary embodiment of the present disclosure, a line connected to the QB node QB of the previous stage is connected to the gate electrode of the ninth transistor T9. Therefore, as compared with the connection to a source electrode in which a voltage difference is significant according to the operation of the first transistor T1, the line is connected to be separated from the first capacitor CQB of the previous stage so that a voltage applied to the QB node QB of the previous stage is constantly maintained and a reliability of the QB node QB of the previous stage is ensured.

A display device according to an exemplary embodiment of the present disclosure includes a gate driver which supplies a gate signal to a plurality of pixels and includes by a plurality of stages, wherein each of the plurality of stages includes a pull-down unit which outputs a first voltage applied to a first voltage line in accordance with a voltage of a Q node as the gate signal, a pull-up unit which outputs a second voltage applied to a second voltage line in accordance with a voltage of a QB node as the gate signal, a Q node controller which controls a voltage of the Q node in accordance with a start signal and a clock signal and a QB node controller which includes a first transistor including a gate electrode connected to a clock signal line to which the clock signal is supplied and controls a voltage of the QB node in accordance with the clock signal, the start signal, and the voltage of the Q node.

The QB node controller may include a first transistor including a gate electrode and a source electrode connected to the clock signal line and a drain electrode connected to a QP node, a second transistor including a gate electrode connected to a start signal line to which the start signal is supplied, a source electrode connected to the second voltage line, and a drain electrode connected to the QP node, a third transistor including a gate electrode connected to the QP node, a source electrode connected to the first voltage line, and a drain electrode connected to the QB node and a fourth transistor including a gate electrode connected to the Q node, a source electrode connected to the first voltage line, and a drain electrode connected to the second voltage line.

The QB node controller may include a first transistor including a gate electrode connected to the clock signal line, a source electrode connected to an inverted start signal line to which an inverted start signal of the start signal is supplied or a line connected to a QB node of a previous stage, and a drain electrode connected to a QP node, a second transistor including a gate electrode connected to a start signal line to which the start signal is supplied, a source electrode connected to the second voltage line, and a drain electrode connected to the QP node, a third transistor including a gate electrode connected to the QP node, a source electrode connected to the clock signal line, and a drain electrode connected to the QB node and a fourth transistor including a gate electrode connected to the Q node, a source electrode connected to the first voltage line, and a drain electrode connected to the second voltage line.

The QB node controller may include a first transistor including a gate electrode connected to the clock signal line, a source electrode connected to the first voltage line, and a drain electrode connected to a QP node, a second transistor including a gate electrode connected to a start signal line to which the start signal is supplied, a source electrode connected to the second voltage line, and a drain electrode connected to the QP node, a third transistor including a gate electrode connected to the QP node, a source electrode connected to the first voltage line, and a drain electrode connected to the QB node and a fourth transistor including a gate electrode connected to the Q node, a source electrode connected to the second voltage line, and a drain electrode connected to the QB node QB.

The QB node controller may further include a ninth transistor including a gate electrode connected to an inverted start signal line to which an inverted start signal of the start signal is supplied or a line connected to a QB node of a previous stage, a source electrode connected to the first voltage line, and a drain electrode connected to a source electrode of the first transistor.

The display device may further include a display panel including an active area in which the plurality of pixels is disposed and a non-active area which encloses the active area, wherein the gate driver is disposed in the active area.

The Q node controller may include a fifth transistor including a source electrode connected to a start signal line to which the start signal is supplied, a drain electrode connected to the Q node, and a gate electrode connected to the clock signal line.

The Q node may include a Q1 node and a Q2 node, the display device may comprise a stabilizer connected between the Q1 node and the Q2 node.

The stabilizer may comprise a sixth transistor, the sixth transistor may comprise a source electrode and a drain electrode connected to the Q1 node and the Q2 node respectively, and a gate electrode connected to the first voltage line.

The first voltage may be a gate low voltage and the second voltage is a gate high voltage.

The QB node controller may further include a first capacitor connected between the QB node and the second voltage line.

The pull-down unit may include a seventh transistor including a gate electrode connected to the Q node, a source electrode connected to the first voltage line, and a drain electrode connected to an output terminal to which the gate signal is output and a second capacitor connected between the Q node and an output terminal to which the gate signal is output, and the pull-up unit may include an eighth transistor including a gate electrode connected to the QB node, a source electrode connected to the output terminal, and a drain electrode connected to the second voltage line.

The display device may comprise a gate link line supplying one or more of the start signal, the clock signal, the first voltage and the second voltage, the gate link line may comprises second gate link line which is disposed in the active area.

Two second gate link lines may be disposed at an edge of the active area adjacent to the non-active area, and may extend in a row direction of the active area on two sides of flexible film respectively.

The gate link line may further comprise first gate link lines and third gate link lines, the first gate link lines may be connected to the two sides of the flexible film respectively, the second gate link lines may be connected to the first gate link lines respectively, and the third gate link lines may be connected to the second gate link lines respectively and extend in a column direction crossing the row direction of the active area.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel including a plurality of pixels; and a gate driver configured to supply a gate signal to the plurality of pixels, the gate driver including a plurality of stages that each comprise:

a pull-down circuit configured to output as the gate signal a first voltage that is applied to a first voltage line responsive to a voltage of a Q node;

a pull-up circuit configured to output as the gate signal a second voltage that is applied to a second voltage line responsive to a voltage of a QB node;

a Q node controller connected to the Q node, the Q node controller configured to control the voltage of the Q node responsive to a start signal and a clock signal received by the Q node controller; and a QB node controller connected to the QB node, the QB node controller including a first transistor having a gate electrode that is connected to a clock signal line that supplies the clock signal and controls the voltage of the QB node responsive to the clock signal, the start signal, and the voltage of the Q node, wherein the QB node controller further includes a third transistor including a gate electrode connected to a drain electrode of the first transistor at a QP node, a source electrode connected to the first voltage line, and a drain electrode connected to the QB node.

2. The display device according to claim 1, wherein the first transistor further includes a source electrode connected to the clock signal line;

wherein the QB node controller further includes:

a second transistor including a gate electrode connected to a start signal line that supplies the start signal, a source electrode connected to the second voltage line, and a drain electrode connected to the drain electrode of the first transistor at the QP node; and a fourth transistor including a gate electrode connected to the Q node, a source electrode connected to the second voltage line, and a drain electrode connected to the drain electrode of the third transistor at the QB node.

3. The display device according to claim 1, wherein the first transistor further includes a source electrode connected to an inverted start signal line that supplies an inverted start signal that is inverted with respect to the start signal or a line connected to a QB node of a previous stage from the plurality of stages;

wherein the QB node controller further includes:

a second transistor including a gate electrode connected to a start signal line that supplies the start signal, a source electrode connected to the second voltage line, and a drain electrode connected to the drain electrode of the first transistor at the QP node; and a fourth transistor including a gate electrode connected to the Q node, a source electrode connected to the first voltage line, and a drain electrode connected to the drain electrode of the third transistor at the QB node.

4. The display device according to claim 1, wherein the first transistor further includes a source electrode electrically connected to the first voltage line;

wherein the QB node controller further includes:

a second transistor including a gate electrode connected to a start signal line that supplies the start signal, a source electrode connected to the second voltage line, and a drain electrode connected to the drain electrode of the first transistor at the QP node; and a fourth transistor including a gate electrode connected to the Q node, a source electrode connected to the second voltage line, and a drain electrode connected to the QB node.

5. The display device according to claim 4, wherein the QB node controller further includes:

a ninth transistor including a gate electrode connected to an inverted start signal line that supplies an inverted start signal that is inverted with respect to the start signal or a line connected to a QB node of a previous stage from the plurality of stages, a source electrode connected to the first voltage line, and a drain electrode connected to the source electrode of the first transistor, wherein the ninth transistor is configured to electrically connect the first transistor to the first voltage line.

6. The display device according to claim 1, wherein the display panel includes an active area in which the plurality of pixels are disposed and a non-active area that encloses the active area, wherein the gate driver is in the active area.

7. The display device according to claim 6, wherein the display device further comprises:

a gate link line supplying one or more of the start signal, the clock signal, the first voltage, and the second voltage, wherein the gate link line comprises a second gate link line in the active area.

8. The display device according to claim 7, wherein two second gate link lines are at an edge of the active area adjacent to the non-active area, and extend in a row direction of the active area on two sides of a flexible film respectively.

9. The display device according to claim 8, wherein the gate link line further comprises first gate link lines and third gate link lines, wherein the first gate link lines are connected to the two sides of the flexible film respectively, the two second gate link lines are connected to the first gate link lines respectively, and the third gate link lines are connected to the two second gate link lines respectively and extend in a column direction crossing the row direction of the active area.

10. The display device according to claim 1, wherein the Q node controller includes:

a fifth transistor including a source electrode connected to a start signal line to which the start signal is supplied, a drain electrode connected to the Q node, and a gate electrode connected to the clock signal line.

11. The display device according to claim 10, wherein the Q node includes a Q1 node and a Q2 node and the display device further comprises:

a stabilizer circuit connected to the Q1 node and the Q2 node.

12. The display device according to claim 11, wherein the stabilizer circuit comprises:

a sixth transistor including a source electrode connected to the drain electrode of the fifth transistor at the Q1 node, a drain electrode connected to the Q2 node, and a gate electrode connected to the first voltage line.

13. The display device according to claim 12, wherein the pull-down circuit includes:

a seventh transistor including a gate electrode connected to the drain electrode of the sixth transistor at the Q2 node, a source electrode connected to the first voltage line, and a drain electrode connected to an output terminal that outputs the gate signal; and a second capacitor connected to the Q2 node and the output terminal, and wherein the pull-up circuit includes an eighth transistor including a gate electrode connected to the QB node, a source electrode connected to the output terminal, and a drain electrode connected to the second voltage line.

14. The display device according to claim 1, wherein the first voltage is a gate low voltage and the second voltage is a gate high voltage that is greater than the gate low voltage.

15. The display device according to claim 1, wherein the QB node controller further includes a first capacitor connected to the QB node and the second voltage line.

* * * * *